(12) United States Patent
Matsuo et al.

(10) Patent No.: US 9,081,129 B2
(45) Date of Patent: Jul. 14, 2015

(54) MULTI-CORE FIBER

(71) Applicants: FUJIKURA LTD., Tokyo (JP); NATIONAL UNIVERSITY CORPORATION HOKKAIDO UNIVERSITY, Sapporo-shi, Hokkaido (JP)

(72) Inventors: Shoichiro Matsuo, Sakura (JP); Kunimasa Saitoh, Sapporo (JP); Masanori Koshiba, Sapporo (JP)

(73) Assignees: FUJIKURA LTD., Tokyo (JP); NATIONAL UNIVERSITY CORPORATION HOKKAIDO UNIVERSITY, Sapporo-shi (JP)

( * ) Notice: Subject to any disclaimer, the term of this patent is extended or adjusted under 35 U.S.C. 154(b) by 0 days.

(21) Appl. No.: 14/334,115

(22) Filed: Jul. 17, 2014

(65) Prior Publication Data

US 2014/0334789 A1  Nov. 13, 2014

Related U.S. Application Data

(63) Continuation of application No. PCT/JP2012/082284, filed on Dec. 13, 2012.

(30) Foreign Application Priority Data

Jan. 19, 2012  (JP) ................................. 2012-009458
Jun. 14, 2012  (JP) ................................. 2012-134673

(51) Int. Cl.
*G02B 6/036* (2006.01)
*G02B 6/02* (2006.01)

(52) U.S. Cl.
CPC ............ *G02B 6/02042* (2013.01); *G02B 6/036* (2013.01)

(58) Field of Classification Search
CPC .................... G02B 6/02042; G02B 6/03616
USPC ........................................................... 385/126
See application file for complete search history.

(56) References Cited

U.S. PATENT DOCUMENTS

2011/0182557 A1* 7/2011 Hayashi ..................... 385/127

FOREIGN PATENT DOCUMENTS

JP  58-115403 A  7/1983
JP  2010-286548 A  12/2010
(Continued)

OTHER PUBLICATIONS

Yao et al., "Development of Hole-Walled Multi-Core Fiber", IEICE Technical Report, Jan. 12, 2012, pp. 23-26, vol. 111, No. 381, w/partial English translation.

(Continued)

*Primary Examiner* — Mark Robinson
*Assistant Examiner* — Eftihia Barnes
(74) *Attorney, Agent, or Firm* — Westerman, Hattori, Daniels & Adrian, LLP

(57) ABSTRACT

A multi-core fiber includes an even number of six or more of cores and a clad that surrounds the outer circumferential surfaces of the cores. The cores are formed of two types of cores and in which an effective refractive index difference in a fundamental mode is 0.002 or less in a predetermined range or more that the effective refractive index difference in the fundamental mode is varied according to a core pitch. Two types of the cores are alternately and annularly disposed at regular spacings. A difference in the mode field diameter of light propagating through the cores is 1 μm or less.

14 Claims, 13 Drawing Sheets

(56) References Cited

FOREIGN PATENT DOCUMENTS

| JP | 2011-170336 A | 9/2011 |
|---|---|---|
| WO | 2010/038863 A1 | 4/2010 |
| WO | 2011/114795 A1 | 9/2011 |

OTHER PUBLICATIONS

Yao et al., "Development of Optical Dispersion Management Multi-Core Fiber", IEICE Technical Report, May 19, 2011, pp. 21-24, vol. 111, No. 69, w/partial English translation.

Okuyama et al., "Investigation on Circularly Arranged Multi-Core Fibers for Increasing the Number of Cores", 2012 Nen The Institute of Electronics, Information and Communication Engineers Sogo Taikai Koen Ronbunshu, Mar. 6, 2012, p. 547, w/partial English translation.

Okuyama et al., "Relationship between Crosstalk and Core Density of Circularly Arranged Multi-Core Fibers", 2012 Nen IEICE Communications Society Taikai Koen Ronbunshu 2, Aug. 28, 2012, p. 184, w/partial English translation.

ITU-T G.650.2, "Transmission Systems and Media, Digital Systems and Networks", Transmission Media and Optical Systems Characteristics—Optical fibre cables, Jul. (2007), (80 pages).

Yao et al., "Reduction of Crosstalk by Hole-Walled Multi-Core Fibers", OFC/NROEC Techinical Digest, (2012) OSA, (3 pages).

Koshiba et al., "Heterogeneous multi-core fibers: proposal and design principle", IEICE Electronics Express, Jan. 25, 2009, pp. 98-103, vol. 6, No. 2.

Hayashi et al., "Crosstalk Variation of Multi-Core Fibre due to Fibre Bend", ECOC, Sep. 2010, We.8.F.6.

Yamashita et al., "Modal Analysis Method for Optical Fibers with Symmetrically Distributed Multiple Cores", Journal of Lightwave Technology, Apr. 1985, pp. 341-346, vol. LT-3, No. 2.

Kishi et al., "A Simple Coupled-Mode Analysis Method for Multiple-Core Optical Fiber and Coupled Dielectric Waveguide Structures", IEEE Transactions on Microwave Theory and Techniques, Dec. 1988, pp. 1861-1868, vol. 36, No. 12.

Yao et al., "Development of Hole-Walled Multi-Core Fiber", IEICE Technical Report, Jan. 12, 2012, pp. 23-26, vol. 111, No. 381.

Yao et al., "Development of Optical Dispersion Management Multi-Core Fiber", IEICE Technical Report, May 19, 2011, pp. 21-24, vol. 111, No. 69.

Takenaga et al., "Characteristics of Trench-Assisted Multi-Core Fiber", IEICE Technical Report, Aug. 18, 2011, pp. 7-10, vol. 111, No. 181.

Okuyama et al., "Investigation on Circularly Arranged Multi-Core Fibers for Increasing the Numbers of Cores", 2012 Nen The Institute of Electronics, Information and Communication Engineers Sogo Taikai Koen Ronbunshu, Mar. 6, 2012, p. 547.

Okuyama et al., "Relationship between Crosstalk and Core Density of Circularly Arranged Multi-Core Fibers", 2012 Nen IEICE Communications Society Taikai Koen Ronbunshu 2, Aug. 28, 2012, p. 184.

International Search Report dated Feb. 19, 2013, issued in corresponding application No. PCT/JP2012/082284.

* cited by examiner

MULTI-CORE FIBER

TECHNICAL FIELD

The present invention relates to a multi-core fiber that can suppress the crosstalk between cores adjacent to each other even in the case where the multi-core fiber is nonlinearly disposed while suppressing splicing losses.

BACKGROUND ART

Currently, optical fibers used for optical fiber communication systems which are generally spreading adopt a structure in which an outer periphery of one core is surrounded by a clad, and information is transmitted when an optical signal propagates in this core. Further, as the optical fiber communication systems spread, the amount of information to be transmitted is dramatically increasing in recent years. Following an increase in the amount of information to be transmitted, the optical fiber communication systems use several tens or several hundreds of multiple optical fibers to perform long-distance optical communication of a large volume.

It is known that, to reduce the number of optical fibers in such an optical fiber communication system, a plurality of signals are transmitted by means of light propagating in respective cores using a multi-core fiber in which outer peripheries of a plurality of cores are surrounded by one clad.

Non-Patent Document 1 below describes such a multi-core fiber. In this multi-core fiber, a plurality of cores are arranged in one clad. For an example of this multi-core fiber, an example is taken in which a single core is disposed in the center of a clad and six cores are disposed around the core disposed in the center. Such a configuration is a structure in which cores can be closely packed, so that a large number of cores can be disposed with respect to the specific outer diameter of the clad. However, as is pointed out in Non-Patent Document 1, in the multi-core fiber, optical signals propagating in respective cores interfere each other, and noise is superimposed on the optical signals propagating in the respective cores in some case. Therefore, Non-Patent Document 1 describes a method for reducing crosstalk in which refractive index differences are changed between the clad and cores adjacent to each other to vary the propagation constants (the wave guide conditions) of the cores adjacent to each other. Moreover, Patent Document 1 below describes a method for varying propagation constants from each other in which refractive index differences or the diameters of cores, for example, are varied from each other. Propagation constants are varied between the cores adjacent to each other as decried above, so that crosstalk can be reduced.

However, even in the multi-core fiber in which the propagation constants of the cores adjacent to each other are different as in Non-Patent Document 1 and Patent Document 1, in the case where the multi-core fiber is bent in a specific bending diameter, one of the cores adjacent to each other is located on the inner side of the arc and the other is located on the outer side of the arc, which sometimes causes the propagation constants of the cores to be matched with each other. Non-Patent Document 2 below describes a multi-core fiber in which an inter-center pitch between cores is set to 30 μm, the MFDs (mode field diameters) of the cores are set to 8.1 μm and 9.4 μm, respectively, and a propagation constant difference is given between the cores. Even in this case, the propagation constants of the cores are matched with each other to degrade crosstalk in the case where the bending radius of the multi-core fiber is about 100 mm.

An optical fiber accommodated in a cable is in a state in which a bend corresponding to a certain radius is applied to the optical fiber. Although the bending radius is greatly different depending on cable designs, the probability of fatigue failure is increased to cause an issue in durability, and bending losses are increased to reduce communication quality at a banding radius smaller than 100 mm. From the viewpoints, such a design is not generally provided in which the bending radius is smaller than a bending radius of 100 mm. Such a bend whose radius is below 100 mm is sometimes applied to input/output ends, branch portions, and the like because of accommodating excessive lengths. However, the lengths are limited as compared with lengths in cable portions, and crosstalk rarely occurs on input/output ends, branch portions, and the like.

CITATION LIST

Non-Patent Documents

Non-Patent Document 1: Masanori KOSHIBA "Heterogeneous multi-core fibers: proposal and design principle" IEICE Electronics Express, Vol. 6, No. 2, 98-103

Non-Patent Document 2: Crosstalk Variation of Multi-core Fiber Due to Fiber Bend: ECOC2010, We.8.F6

Patent Document

Patent Document 1: International Publication No. WO/2010/0388863

SUMMARY OF INVENTION

Objects to be Achieved by the Invention

An optical fiber is generally disposed linearly as well as disposed nonlinearly in some cases. For example, in a cable having a plurality of optical fibers accommodated in the cable, the optical fibers are often spirally disposed in the cable. In this case, even in the case where the propagation constants of cores adjacent to each other are varied as in Non-Patent Document 1 and Patent Document 1 described above, the optical propagation constants of the cores adjacent to each other are sometimes matched with each other as described in Non-Patent Document 2 above. The state repeatedly occurs or continues for a long time, and the crosstalk between the cores adjacent to each other is prone to deteriorate.

In the case where a multi-core fiber is nonlinearly disposed as described above, in order to suppress the crosstalk between cores adjacent to each other, such a configuration may be performed in which the mode field diameter (MFD) of light propagating through cores is greatly changed to considerably alter the propagation constants of the cores adjacent to each other. However, in the case where the mode field diameter of light propagating through cores is greatly changed as described above, in connecting a plurality of multi-core fibers, attenuation caused by connection becomes considerably large when cores whose mode field diameters are different from each other are connected to each other.

Therefore, it is an object of the present invention to provide a multi-core fiber that can suppress the crosstalk between cores adjacent to each other even in the case where the multi-core fiber is nonlinearly disposed while suppressing splicing losses.

Means for Achieving the Objects

The present inventors dedicatedly conducted investigations in order to achieve the objects. In the case where a multi-core fiber is bent, the crosstalk between cores adjacent to each other sharply deteriorates at a certain bending radius specific to the multi-core fiber. Therefore, the present inventors considered that when the bending radius at which this crosstalk is at a peak is smaller than the minimum bending radius under a general use environment of an optical fiber, the crosstalk between cores adjacent to each other can be suppressed without the necessity to considerably change the mode field diameter (MFD) of light propagating through cores adjacent to each other.

As described above, when an optical fiber is bent at a small bending radius, the probability of fatigue failure is increased and the attenuation of light propagating through a core due to the bend becomes large, for example. Because of the reasons, the minimum bending radius of an optical fiber in a cable is generally set to 100 mm. Therefore, it is considered that when the bending radius of an optical fiber at which crosstalk is at a peak is smaller than a bending radius of 100 mm, which is the minimum bending radius under a general use environment of an optical fiber, crosstalk can be sufficiently suppressed under a general use environment of a multi-core fiber.

Moreover, a general core pitch (an inter-center pitch between cores adjacent to each other) in a multi-core fiber generally ranges from 30 μm to 50 μm from the viewpoint of preventing the crosstalk between cores adjacent to each other and from the viewpoint of preventing the outer diameter of a clad from becoming too large. The bending radius of an optical fiber at which crosstalk is at a peak can be generally determined from the effective refractive index difference between cores adjacent to each other and the core pitch between the cores. Therefore, the present inventors considered that it would work in which the effective refractive index difference between cores adjacent to each other is set in such a way that the bending radius of an optical fiber at which crosstalk is at a peak is a bending radius smaller than a bending radius of 100 mm, which is the minimum bending radius under a general use environment of an optical fiber, in a range in which the core pitch ranges from 30 μm to 50 μm.

As a result of dedicated investigations, the present inventors found that the effective refractive index difference between cores adjacent to each other is a predetermined value or more, which is changed according to a core pitch, in order that the bending radius of an optical fiber at which crosstalk is at a peak is made smaller than a bending radius of 100 mm, in a range in which the core pitch ranges from 30 μm to 50 μm. Thus, the present inventors thought that the objects can be achieved when the effective refractive index difference between cores adjacent to each other in a multi-core fiber is made greater than this predetermined value.

However, it was revealed that even though the effective refractive index difference between cores adjacent to each other is simply made greater than this predetermined value to design a multi-core fiber, it is sometimes difficult to dispose cores as similar to a previously existing multi-core fiber in an allowable range of the radius of a core through which a fundamental mode can propagate and the refractive index difference between cores and a clad.

Therefore, the present inventors further dedicatedly conducted investigations to achieve the present invention.

Namely, a multi-core fiber according to the present invention includes: an even number of six or more of cores; and a clad surrounding outer circumferential surfaces of the cores. The even number of cores is formed of two types of cores between which an effective refractive index difference in a fundamental mode is different. In the even number of cores, the two types of cores are alternately disposed at regular spacings, and the cores are annularly disposed at an interior angle formed of lines connecting centers of the cores adjacent to each other, the interior angle being greater than an angle of 90°. A difference in a mode field diameter of light propagating through the cores is 1 μm or less. An expression is satisfied:

$$1.450 \times 10^{-5} \times D \leq \Delta n_{eff} \leq 0.002$$

wherein an inter-center pitch between the cores adjacent to each other is D μm and an effective refractive index difference between the cores adjacent to each other is $\Delta n_{eff}$.

According to such a multi-core fiber, the difference in the mode field diameter of light propagating through the cores is 1 μm or less, so that splicing losses can be made smaller even in the case where different types of cores are connected to each other when a plurality of the multi-core fibers is connected.

Moreover, as a result of dedicated investigations conducted by the present inventors, it was found that in order that the bending radius of an optical fiber at which crosstalk is at a peak is made smaller than a bending radius of 100 mm, the effective refractive index difference between cores adjacent to each other is a predetermined value or more, which is changed according to a core pitch, as described above. More specifically, it was found that the following expression is satisfied:

$$1.450 \times 10^{-5} \times D \leq \Delta n_{eff}$$

wherein an inter-center pitch between cores adjacent to each other is D and the effective refractive index difference between the cores adjacent to each other is $\Delta n_{eff}$. Furthermore, it was found that although the difference in the mode field diameter of light propagating through the cores is 1 μm or less and it is possible to dispose two types of the cores between which the effective refractive index difference was 0.002 or less in the general use range of the optical fiber, it is difficult to dispose two types of cores whose effective refractive indices are different from each other when the effective refractive index exceeds 0.002. In addition, it was found that it is sometimes difficult to dispose three types of cores whose effective refractive indices difference satisfy the conditions. Therefore, the present inventors reached the conclusion that only two types of cores whose effective refractive indices are different from each other are used and it is necessary to annularly dispose the cores in order to dispose a plurality of the cores. To this end, it is necessary that the number of the cores be an even number. However, in the case of four cores, even in different types of cores adjacent to each other, the cores diagonally opposite to each other have the same effective refractive indices. In this case, when the pitch between the cores adjacent to each other is a practical core pitch (30 μm to 50 μm), the pitch between the cores diagonally opposite to each other is not increased so much, and it is likely to cause the crosstalk between these cores. Thus, it was found that it is necessary that the number of the cores be six or more. Moreover, in the case where cores are disposed in a polygon, when the pitch between the cores disposed next to the core disposed at the vertex is a close pitch, it is likely to cause crosstalk as well because these cores have the same effective refractive indices. Therefore, from the foregoing discussions in four cases of cores, the present inventors reached the conclusion that crosstalk can be suppressed sufficiently when an interior angle formed of lines connecting the centers of two cores adjacent to each other is at an angle of 90° or more.

From the result found as described above, the present inventors reached the conclusion that the objects can be achieved by such a multi-core fiber in a configuration in which an even number of six or more of cores are formed of two types of cores between which the effective refractive index difference $\Delta n_{eff}$ is a predetermined value or more and 0.002 or less derived from the expression changed according to the core pitch and the two types of the cores are annularly disposed in which an interior angle formed of lines connecting the centers of two cores adjacent to each other is greater than an angle of 90°. According to such a multi-core fiber, the bending radius of the optical fiber at which crosstalk is at a peak can be made smaller than a bending radius of 100 mm, which is the minimum bending radius under a general use environment of an optical fiber.

Thus, according to such a multi-core fiber, the mode field diameter of light propagating through the cores adjacent to each other is not changed so much, crosstalk can be suppressed in the general use state while splicing losses can be suppressed.

Moreover, preferably, the inter-center pitch and the effective refractive index difference further satisfy an expression:

$$2.071 \times 10^{-5} \times D \leq \Delta n_{eff}.$$

By satisfying the conditions, the bending radius of the optical fiber at which crosstalk is at a peak can be 70 mm or less that is much smaller than a bending radius of 100 mm, which is the minimum bending radius under a general use environment of an optical fiber.

Furthermore, the inter-center pitch and the effective refractive index difference may further satisfy an expression:

$$0.001 \leq \Delta n_{eff}.$$

In addition, preferably, when the number of cores is n, the cores are disposed in an n-sided regular polygon.

The fact that the cores are disposed as described above can be thought as well that the cores are annularly disposed. The cores are disposed in this manner, so that the influence exerted from the adjacent core is made equal between the cores, and the cores can maintain the uniformity of light propagating through the cores.

Moreover, preferably, the cores are disposed in a regular hexagon.

For a method of manufacture of a multi-core optical fiber, a stack-and-draw method and a boring method are known. The stack-and-draw method is a method also for use in manufacture of a photonic crystal fiber. In this method, cores are disposed in which cylindrical glass rods including a region to be a core are combined in a close-packed hexagonal lattice. The combined glass rods to be these cores are inserted into a glass tube and solidified to obtain a multi-core fiber base material, and this base material is drawn to obtain a multi-core fiber. In the stack-and-draw method, such multi-core fibers can be easily produced including a seven-core multi-core fiber in which six cores are disposed in a hexagon around the center core and a 19-core multi-core fiber in which 12 cores are disposed in a hexagon further around the outer circumference of a seven-core multi-core fiber. For example, in the stack-and-draw method, when a glass rod with no core is used instead of a glass rod to be a core disposed in the center part and 12 glass rods with cores are disposed around the glass rod, such a multi-core fiber can be implemented in which 12 cores are annularly disposed in a hexagon. Also in the case of multi-core fibers having cores whose number is a multiple of six greater than 12 such as 18 cores and 24 cores, these multi-core fibers can be similarly manufactured. Thus, in the case where cores are disposed in a regular hexagon, multi-core fibers including a larger number of cores can be easily manufactured by existing methods.

On the other hand, a multi-core fiber can be implemented by the boring method in which a hole is bored in a glass base material prepared beforehand using a drill, for example, a cylindrical glass rod including a region to be a core is inserted into the hole, and a void is squeezed. In the boring method, since cores can be disposed at given locations in a glass base material, the method is suited to implement cores annularly disposed.

Moreover, preferably, the multi-core fiber further includes: a first clad surrounding outer circumferential surfaces of the cores; and a second clad surrounding an outer circumferential surface of the first clad, an outer circumferential surface of the second clad being surrounded by the clad. All of expressions are satisfied:

$$n_{1\text{-}1} > n_2 > n_3$$

$$n_{1\text{-}2} > n_2 > n_3$$

$$n_{1\text{-}1} > n_4$$

$$n_{1\text{-}2} > n_4$$

$$n_3 < n_4$$

wherein a refractive index of one of the two types of cores is $n_{1\text{-}1}$, a refractive index of the other of the two types of cores is $n_{1\text{-}2}$, a refractive index of the first clad is $n_2$, a refractive index of the second clad is $n_3$, and a refractive index of the clad is $n_4$.

In the case where the core, the first clad, and the second clad are considered to be a core element, the core is surrounded by the first clad having the refractive index $n_2$ smaller than the refractive indices $n_{1\text{-}1}$ and $n_{1\text{-}2}$ of the cores, and the first clad is surrounded by the second clad having the refractive index $n_3$ smaller than the refractive index $n_2$ of the first clad. Thus, in the case where the core elements are seen from the viewpoint of the refractive indices, the core elements have a trench structure. In the multi-core fiber in the structure, since the refractive index $n_3$ of the second clad is smaller than the refractive index $n_2$ of the first clad for light propagating through the core, so that light is more properly confined in the core, and it is suppressed that light leaks out of the core elements. Accordingly, according to such a multi-core fiber, the crosstalk between cores can be further reduced.

Effect of Invention

As described above, according to the present invention, there is provided a multi-core fiber that can suppress the crosstalk between cores adjacent to each other even in the case where the multi-core fiber is nonlinearly disposed while suppressing splicing losses.

DESCRIPTION OF EMBODIMENTS

Figure 1A:
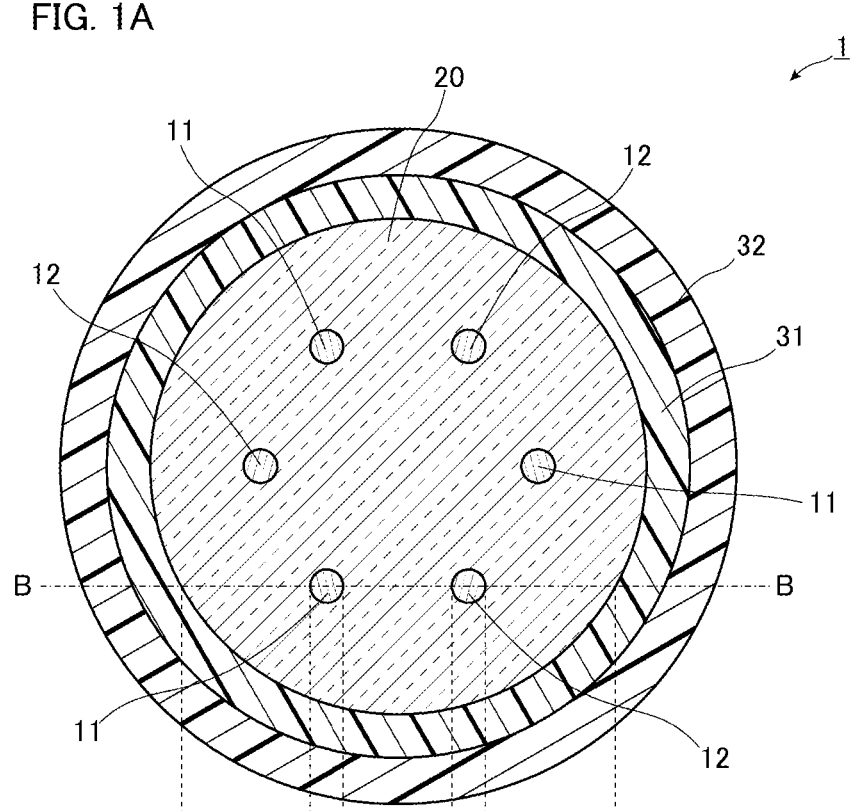
FIGS. 1A and 1B are diagrams of a multi-core fiber according to a first embodiment of the present invention.

A preferred embodiment of a multi-core fiber according to the present invention will be described in detail below referring to the drawings. In addition, for ease of understanding, a scale disclosed in each drawing and a scale disclosed below are different in some cases.

First Embodiment

Figure 1B:
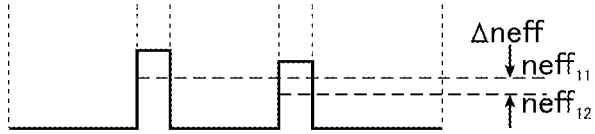

FIGS. 1A and 1B are diagrams of a multi-core fiber according to an embodiment of the present invention. More specifically, FIG. 1A is a diagram of a structure on a cross section perpendicular to the longitudinal direction of the multi-core fiber, and FIG. 1B is a schematic diagram of effective refractive indices along a line B-B of the multi-core fiber 1 in FIG. 1A. It is noted that FIG. 1B schematically depicts the effective refractive indices in the case where the multi-core fiber is disposed linearly.

As depicted in FIG. 1A, the multi-core fiber 1 according to the embodiment includes a plurality of two types of cores 11 and 12 whose effective refractive indices are different from each other, a clad 20 that surrounds the cores 11 and 12 entirely, fills the space between the cores 11 and 12, and surrounds the outer circumferential surface of the cores 11 and 12 with no spacing, an inner protective layer 31 that covers the outer circumferential surface of the clad 20, and an outer protective layer 32 that covers the outer circumferential surface of the inner protective layer 31.

As depicted by a solid line in FIG. 1B, the refractive indices of the cores 11 and 12 are set higher than the refractive index of the clad 20. Moreover, the cores 11 and 12 are disposed in which the core 11 and the core 12 are alternately disposed, a core pitch D between the core 11 and the core 12 adjacent to each other is set constant, and the cores 11 and 12 are annularly disposed in a regular polygon as a whole which has vertices in the same number as the number of the cores 11 and 12. Namely, in the case where the number of the cores 11 and 12 is n, the cores 11 and 12 are disposed in an n-sided regular polygon. It is noted that the center of a regular polygon in which the core 11 is disposed is matched with the axis of the clad 20. The fact that the cores 11 and 12 are disposed in this manner can also be grasped that the cores 11 and 12 are annularly disposed as the center of the ring is matched with the axis of the clad 20. Since two types of the cores 11 and 12 are alternately and annularly disposed as described above, the total number of the cores 11 and the cores 12 is an even number.

Moreover, the core pitch D of the multi-core fiber 1 ranges from 30 μm to 50 μm. The core pitch D is 30 μm or more, so that the crosstalk between cores adjacent to each other can be suppressed. Furthermore, the core pitch D is 50 μm or less, and the diameter of the multi-core fiber 1 can be kept smaller. Thus, even in the case where the multi-core fiber 1 is disposed in the state in which the multi-core fiber 1 is bent, the possibility of breakage can be reduced.

Furthermore, a mode field diameter difference ΔMFD between the cores 11 and 12 adjacent to each other is 1 μm or less. In addition, an effective refractive index difference $\Delta n_{eff}$ between the cores 11 and 12 is a difference between an effective refractive index $n_{eff1}$ of the core 11 and an effective refractive index $n_{eff2}$ of the core 12 adjacent to each other, and the difference is indicated by broken lines in FIG. 1B. The effective refractive index difference $\Delta n_{eff}$ between the cores 11 and 12 satisfies Expression (1).

$$1.450 \times 10^{-5} \times D \le \Delta n_{eff} \le 0.002 \quad (1)$$

In order to obtain the effective refractive index difference $\Delta n_{eff}$ satisfying Expression (1) and the mode field diameter difference ΔMFD, although not particularly specified, such a configuration may be possible in the core 11, for example, in which a radius $d_1$ is 4.5 μm and a refractive index difference $\Delta_{11}$ with respect to the clad 20 is 0.40%, and in the core 12, a radius $d_2$ is 4.0 μm and a refractive index difference $\Delta_{12}$ with respect to the clad 20 is 0.35%. Moreover, the diameter of the clad 20 is 160 μm, for example. It is noted that in the multi-core fiber 1 according to the embodiment, as depicted in FIG. 1A, the number of the cores is six in total, and the cores 11 and 12 are disposed in a regular hexagon.

Next, the relationship between the effective refractive index difference between the cores adjacent to each other and the bending radius of the multi-core fiber at which the crosstalk between the cores adjacent to each other is at a peak will be described.

A bending radius $R_{pk}$ of the multi-core fiber at which the crosstalk between the cores adjacent to each other is at a peak is given by Expression (2) below. However, in Expression (2) below, $n_{eff11}$ is the effective refractive index of the core 11, which is one of the cores 11 and 12 adjacent to each other, $n_{eff12}$ is the effective refractive index of the core 12, which is the other of the cores 11 and 12 adjacent to each other, $\Delta n_{eff}$ is a difference between $n_{eff11}$ and $n_{eff12}$, and D is the core pitch between the cores 11 and 12.

$$R_{pk} = \frac{n_{eff11}}{|n_{eff11} - n_{eff12}|} D = \frac{n_{eff11}}{\Delta n_{eff}} D \qquad (2)$$

Figure 2:
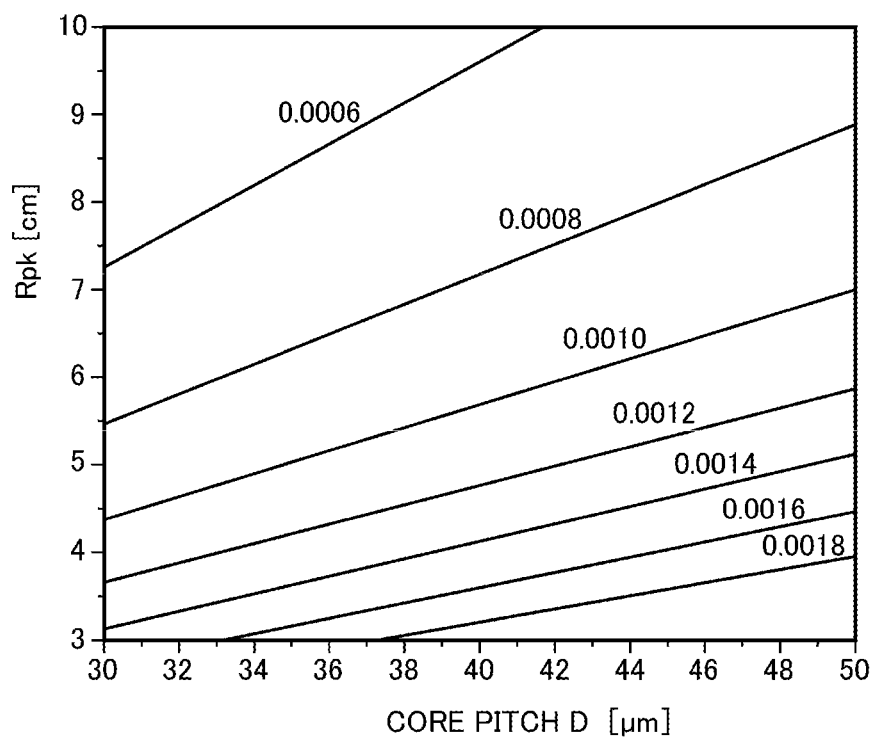
FIG. 2 is a diagram of the distribution of the effective refractive index difference between cores for individual effective refractive index differences in the case where a core pitch in the multi-core fiber and a bending radius at which crosstalk is at a peak are determined.

FIG. 2 is a diagram of the distribution of the effective refractive index difference between the cores for individual effective refractive index differences in the case where a core pitch in the multi-core fiber and a bending radius at which crosstalk is at a peak are determined. FIG. 2 can be depicted using Expression (2) above. It is noted that in FIG. 2, the effective refractive index of the core 11 $n_{eff11}$ is 1.45. However, the effective refractive index of the core 11 $n_{eff11}$ is a considerably larger value than the value of the effective refractive index difference $\Delta n_{eff}$ between the cores 11 and 12. Even in the case where the effective refractive index of the core 11 $n_{eff11}$ is changed in a range generally considered, FIG. 2 is not changed so much.

However, when the optical fiber is bent at a small bending radius as described above, the probability of fatigue failure is increased and the attenuation of light propagating through the core due to the bend becomes large, for example. Because of the reasons, the minimum bending radius of the optical fiber is generally 100 mm. Thus, it is considered that crosstalk can be sufficiently suppressed under a general use environment of an optical fiber when the bending radius $R_{pk}$ of an optical fiber at which crosstalk is at a peak is smaller than the minimum bending radius. Thus, in a range in which the core pitch ranges from 30 μm to 50 μm, the effective refractive index difference $\Delta n_{eff}$ between the cores 11 and 12 adjacent to each other may be set in such a way that the bending radius $R_{pk}$ of this optical fiber is smaller than 100 mm. Moreover, it can be considered that crosstalk can be further suppressed under a general use environment of an optical fiber when the bending radius $R_{pk}$ is 70 mm or less including a margin 30% or more of the margin of a minimum bending radius of 100 mm for an optical fiber.

Figure 3:
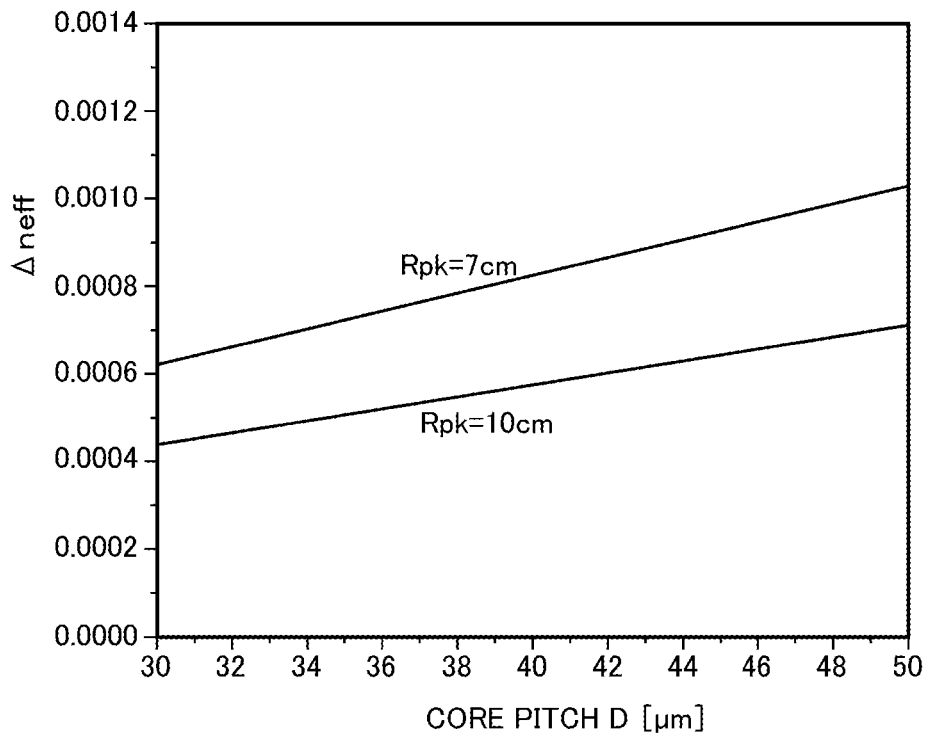
FIG. 3 is a diagram of the dependence of the effective refractive index difference between cores adjacent to each other on the core pitch in the case where the bending radius is 100 mm and in the case where the bending radius is 70 mm.

FIG. 3 is a diagram that FIG. 2 is rewritten on the dependence of the effective refractive index difference $\Delta n_{eff}$ between the cores 11 and 12 on the core pitch D in the case where the bending radius $R_{pk}$ is 100 mm and in the case where the bending radius $R_{pk}$ is 70 mm. In FIG. 3, in the case where the bending radius $R_{pk}$ is 100 mm and in the case where the bending radius $R_{pk}$ is 70 mm, the dependence of the effective refractive index difference $\Delta n_{eff}$ between the cores 11 and 12 on the core pitch D is found from Expression (2).

As depicted in FIG. 3, in the case where the bending radius $R_{pk}$ is 100 mm, the relationship between the effective refractive index difference $\Delta n_{eff}$ and the core pitch D is expressed by Expression (3).

$$\Delta n_{eff} = 1.450 \times 10^{-5} \times D - 8.788 \times 10^{-19} \qquad (3)$$

In order to achieve the bending radius $R_{pk}$ smaller than 100 mm, the effective refractive index difference $\Delta n_{eff}$ may be greater than a value expressed by Expression (3). Therefore, Expression (4), which is a part of Expression (1), can be obtained by removing the second term ten digits smaller in units.

$$1.450 \times 10^{-5} \times D \leq \Delta n_{eff} \qquad (4)$$

It is shown that the peak of crosstalk becomes smaller than 100 mm when Expression (4) is satisfied.

Moreover, in the case where the bending radius $R_{pk}$ is 70 mm, Expression (5) is satisfied.

$$\Delta n_{eff} = 2.071 \times 10^{-5} \times D \qquad (5)$$

Thus, more preferably, in the multi-core fiber 1 depicted in FIGS. 1A and 1B, the effective refractive index difference $\Delta n_{eff}$ between the cores 11 and 12 satisfies Expression (6).

$$2.071 \times 10^{-5} \times D \leq \Delta n_{eff} \qquad (6)$$

In this case, the peak of crosstalk becomes 70 mm or less.

Furthermore, it is shown from FIG. 2 that the effective refractive index difference $\Delta n_{eff}$ at which the bending radius $R_{pk}$ is 70 mm or less is generally 0.001 or more regardless of the core pitch. Therefore, in the multi-core fiber 1 depicted in FIGS. 1A and 1B, the effective refractive index difference $\Delta n_{eff}$ between the cores 11 and 12 may be 0.001 or more. As described above, in order to satisfy Expression (1) in the multi-core fiber 1, the bending radius $R_{pk}$ of the multi-core fiber 1 is smaller than 100 mm, at which the crosstalk between the cores 11 and 12 adjacent to each other is at a peak.

Next, as described above, cores that can be disposed in the multi-core fiber will be described in the case where the effective refractive index difference $\Delta n_{eff}$ between the cores 11 and 12 adjacent to each other satisfies Expression (1) above.

Figure 4:
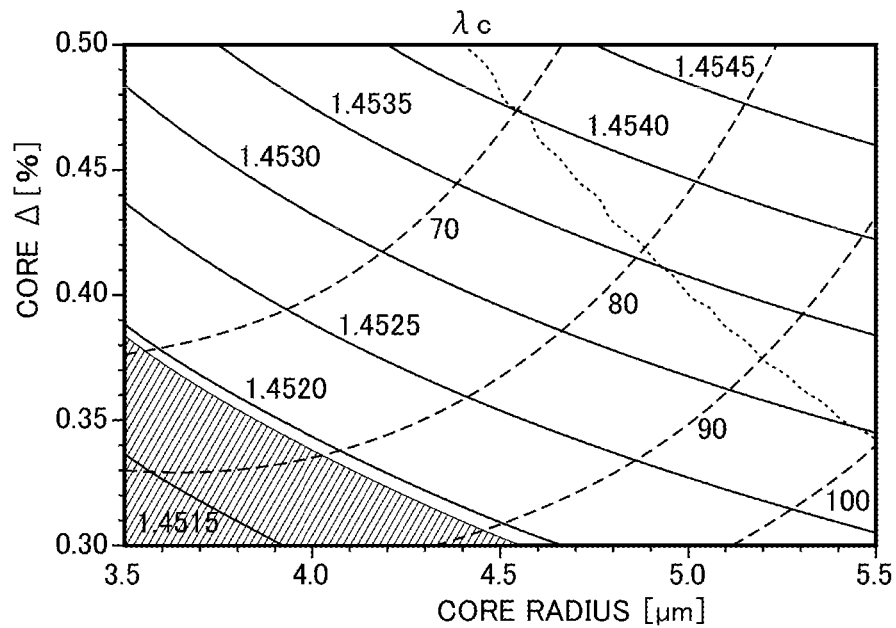
FIG. 4 is a diagram of the distribution of the effective refractive index of a core for individual effective refractive indices at a wavelength of 1,550 nm, in the case where the radius of the core and the refractive index difference between the core and a clad are determined.

FIG. 4 is a diagram of the distribution of the effective refractive index of a core for individual effective refractive indices at a wavelength of 1,550 nm in the case where the radius of the core and the refractive index difference between the core and a clad are determined in a typical optical fiber. In FIG. 4, the horizontal axis expresses the radius of the core, and the vertical axis expresses the refractive index difference between the core and the clad. Moreover, a hatched region is a region in which the bending loss is 0.5 dB or more in the case where light at a wavelength of 1,625 nm is wound at 100 turns at a radius of 30 mm. This region is a region that is not allowed for use in optical fibers in a waveband of 1.5 μm because bending losses are large. Furthermore, λc indicated by a dotted line expresses a cutoff wavelength of 1,530 nm. In the optical fiber in a waveband of 1.5 μm, the region on the right side of λc indicated by a dotted line is a region not allowed for use.

In FIG. 4, solid lines indicate the distributions of effective refractive indices. Here, attention is focused on two effective refractive indices 1.4530 and 1.4520 between which the effective refractive index difference $\Delta n_{eff}$ is 0.001, for example. As apparent from FIG. 4, a solid line at which the effective refractive index is 1.4530 and a solid line at which the effective refractive index is 1.4520 are distributed in a wider range than the region in which the multi-core fiber can be used (the region not included in the hatched region and on the left side of λc indicated by a dotted line). Thus, two types of cores between which the effective refractive index difference $\Delta n_{eff}$ is 0.001 can be designed in such a way that the cores are located in the region in which the optical fiber can be used. Here, when the core pitch D ranges from 30 μm to 50 μm, which are the maximum values of a practical core pitch, from Expression (3) above, the effective refractive index difference $\Delta n_{eff}$ ranges 0.000435 to 0.000725, which are smaller than 0.001. It is noted that the second term of Expression (3) is ignored because the value is considerably small. Thus, the effective refractive index difference $\Delta n_{eff}$ that the second term of Expression (3) above is ignored is distributed in a wide range in which the multi-core fiber can be used. In other words, in this case, the cores can coexist in a single clad.

On the other hand, from FIG. 4, in the case where attention is focused on two effective refractive indices between which the effective refractive index difference $\Delta n_{eff}$ exceeds 0.002, when the effective refractive index is determined for one of the cores in such a way that the core is located in the usable region, it is difficult to determine the effective refractive index for the other core in such a way that the core is located in the usable region. In other words, in order to dispose two cores in a single clad in the usable state, the effective refractive index difference $\Delta n_{eff}$ may be 0.002 or less.

This means that the effective refractive index difference $\Delta n_{eff}$ between the core 11 and the core 12 of the multi-core fiber 1 satisfies Expression (1) above.

Figure 5:
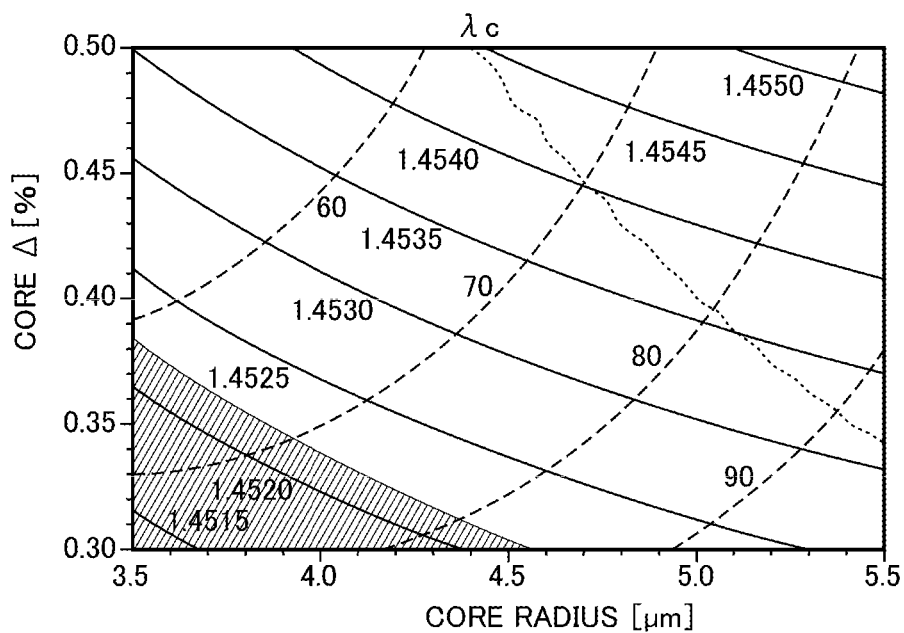
FIG. 5 is a diagram of the distribution of the effective refractive index of a core for individual effective refractive indices, in the case where the radius of the core and the refractive index difference between the core and a clad are determined at a wavelength of 1,450 nm.
Figure 6:
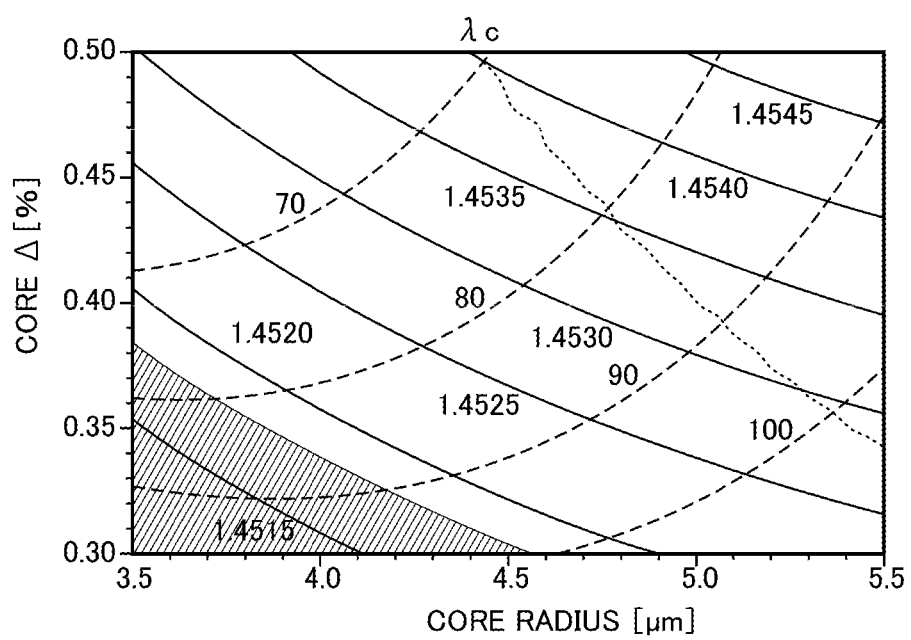
FIG. 6 is a diagram of the distribution of the effective refractive index of a core for individual effective refractive indices at a wavelength of 1,625 nm, in the case where the radius of the core and the refractive index difference between the core and a clad are determined.

FIG. 5 is a diagram similar to FIG. 4 in the case of a wavelength of 1,450 nm. Also in FIG. 5, as similar to the description using FIG. 4, it is shown that two cores can be disposed in a single clad when the effective refractive index difference $\Delta n_{eff}$ satisfies Expression (1) above. Moreover, FIG. 6 is a diagram similar to FIG. 4 in the case of a wavelength of 1,625 nm. As also apparent from FIG. 6, as similar to FIG. 4, it is shown that two cores can be disposed in a single clad when the effective refractive index difference $\Delta n_{eff}$ satisfies Expression (1) above. In other words, as apparent from the description using FIGS. 4 to 6, it is shown that in order to dispose two cores in a single clad regardless of the wavelength, the effective refractive index difference $\Delta n_{eff}$ satisfies Expression (1) above.

Next, the splicing loss caused by the difference in the mode field diameter of light propagating through the cores will be described.

Suppose that there are two optical fibers whose mode field diameter of light propagating through the core is different from each other, and the mode field diameters of light are $MFD_1$ and $MFD_2$. An optical attenuation a produced in the case where the optical fibers are connected to each other can be expressed by Expression (7) below.

$$a = -10\log\left(\frac{2\frac{MFD_1}{2}\frac{MFD_2}{2}}{\left(\frac{MFD_1}{2}\right)^2 + \left(\frac{MFD_2}{2}\right)^2}\right) \quad (7)$$

From Expression (7) above, for example, in the case where the mode field diameters of light propagating through the cores of two optical fibers are 9 μm and 8.4 μm, the splicing loss a is 0.04 dB. At such a splicing loss, two optical fibers can be connected to each other with no practical troubles. Moreover, in the case where the mode field diameter difference between the optical fibers is 1 μm, the splicing loss a becomes 0.06 dB. Also in this case, two optical fibers can be connected to each other with no practical troubles. As described above, since the mode field diameter difference between the core 11 and the core 12 of the multi-core fiber 1 is 1 μm or less, in the case where a plurality of the multi-core fibers 1 is connected, splicing losses with no practical troubles are achieved even though the core 11 and the core 12 are connected to each other. Moreover, the fact that the core 11 and the core 12 may have different mode field diameters means that the diameter of the core can be adjusted in a range in which the difference in the mode field diameter of light propagating through the cores is 1 μm or less in the multi-core fiber 1. Thus, even in the case where the refractive index difference between the cores and the clad is varied, it is shown that the diameter of the core is adjusted to achieve the effective refractive index at an appropriate value.

It is noted that single mode fibers generally widely used are defined in ITU-T G.652 Recommendation (version in November 2009), and the tolerance of the mode field diameter is specified in ±0.6 μm. Moreover, long distance transmission fibers such as a submarine line are defined in ITU-T G.654 Recommendation (in December 2006), and the tolerance of the mode field diameter is specified in ±0.7 μm. The tolerances are defined from the viewpoint of splicing losses including axial displacement. Thus, when the mode field diameter difference is 1 μm or less as described above, splicing losses low enough can be secured in compliance with the international recommendations.

Furthermore, FIGS. 4 to 6 are diagrams of the distribution of the effective area $A_{eff}$ of the core for individual effective areas expressed by broken lines in the case where the radius of the core and the refractive index difference between the core and the clad are determined. The relationship between the mode field diameter MFD of light propagating through the optical fiber and the effective area $A_{eff}$ at this time is expressed by Expression (8) below.

$$A_{eff} = k\frac{\pi}{4}(MFD)^2 \quad (8)$$

wherein, k is a coefficient depending on the refractive index of the core. According to ITU-T G.650.2, Transmission media and optical systems characteristics—Optical fibre cables (version in July 2007), in typical optical fibers, k generally takes a value ranging from 0.960 to 0.985.

In the case where the mode field diameter is 10 μm, $A_{eff}$ takes a value reneging from 75 μm² to 77 μm². Suppose that a variation in the mode field diameter MFD is Δ in the case where the mode field diameter MFD is changed from $MFD_1$ to $MFD_2$, a variation $\Delta A_{eff}$ in the effective area $A_{eff}$ of the core is given by Expression (9) below. It is noted that $A_{eff1}$ expresses the effective area in the case where the mode field diameter is $MFD_1$, and $A_{eff2}$ expresses the effective area in the case where the mode field diameter is $MFD_2$.

$$\begin{aligned}\Delta A_{eff} &= A_{eff2} - A_{eff1} \\ &= k\frac{\pi}{4}(MFD_2^2 - MFD_1^2) \\ &= k\frac{\pi}{4}\{(MFD_1 + \Delta)^2 - MFD_1^2\} \\ &= k\frac{\pi}{4}(2\Delta MFD_1 + \Delta^2)\end{aligned} \quad (9)$$

Therefore, when the mode field diameter is changed by 1 μm from 10 μm to 11 μm, the effective area of the core is changed from 15.8 μm² to 16.2 μm². Thus, for example, in FIG. 4, cores between which the mode field diameter difference is smaller than 1 μm are designed in such a way that the effective areas $A_{eff}$ of the cores are 70 μm² and 80 μm² and the effective refractive index difference $\Delta n_{eff}$ satisfies Expression (1) above. In such a design, a reduction in crosstalk and a reduction in splicing losses can be combined. Two cores between which the mode field diameter is different by 1 μm as described above are both located in the region in which the optical fiber can be used, so that these two cores can be disposed simultaneously in a single clad. Thus, as described above, since the mode field diameter difference between the core 11 and the core 12 of the multi-core fiber 1 is 1 μm or less, so that the core 11 and the core 12 are in the usable state.

As described above, in accordance with the multi-core fiber 1 according to the embodiment, the difference in the mode field diameter of light propagating through the cores is 1 μm or less, so that splicing losses can be made smaller regardless of the combination of cores in the case where a plurality of the multi-core fibers is connected.

Moreover, in the multi-core fiber 1, an even number of six or more of cores are annularly disposed as described above, and a specific core is not disposed adjacently to three or more of cores. Thus, different types of cores can be always alternately disposed using two types of the cores 11 and 12 between which the effective refractive index difference $\Delta n_{eff}$ satisfies Expression (1) above. Furthermore, the effective refractive index difference $\Delta n_{eff}$ between the cores adjacent to each other satisfies Expression (1) above, so that these cores are in a usable range in a single multi-core fiber. In addition, such an effective refractive index difference $\Delta n_{eff}$ is provided between the cores 11 and 12, so that the multi-core fiber 1 can have the bending radius Rpk of the optical fiber, at which crosstalk is at a peak, smaller than the minimum bending radius (100 mm) under a general use environment of an optical fiber. Thus, according to the multi-core fiber 1, the crosstalk between cores adjacent to each other can be suppressed even in the case where the multi-core fiber 1 is non-linearly disposed.

Second Embodiment

Next, a second embodiment of the present invention will be described in detail with reference to FIGS. 7A and 7B. It is noted that components the same as or equivalent to the components of the first embodiment are designated the same reference numerals and signs, and the overlapping description is omitted unless otherwise specified.

Figure 7A:
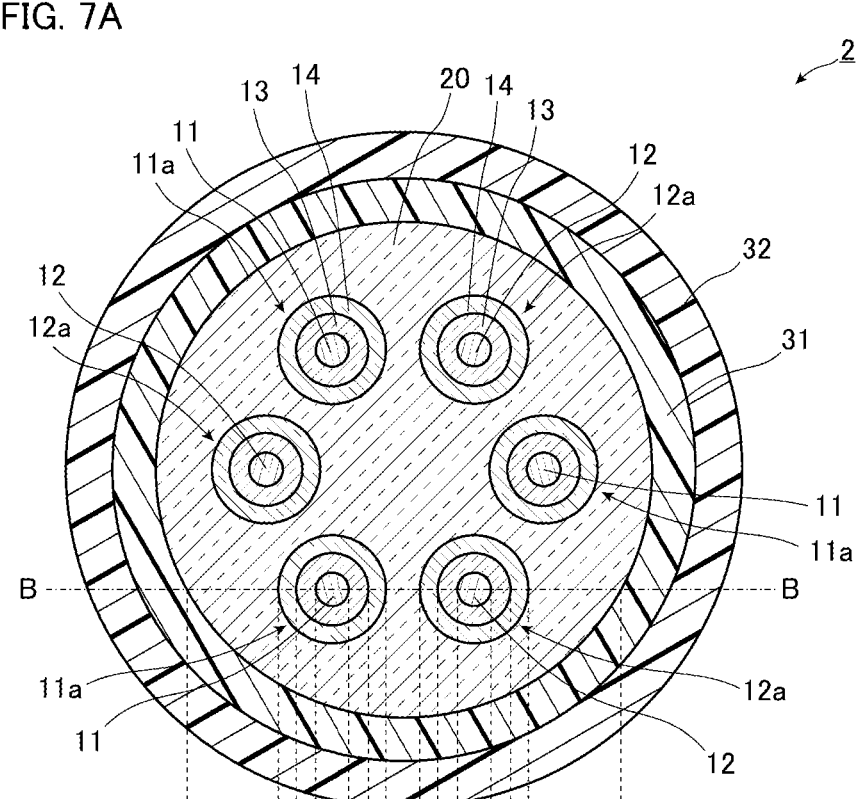
FIGS. 7A and 7B are diagrams of a multi-core fiber according to a second embodiment of the present invention.
Figure 7B:
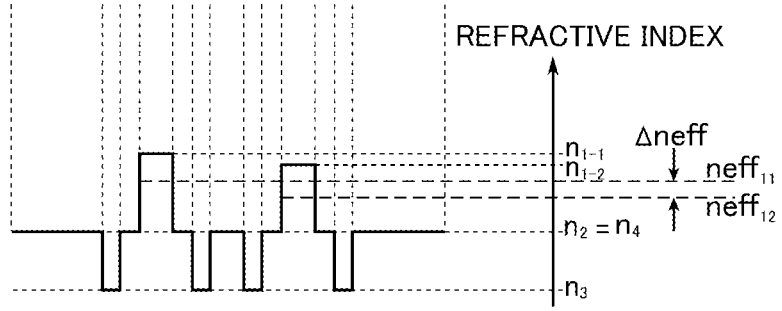

FIGS. 7A and 7B are diagrams of a multi-core fiber according to the second embodiment of the present invention. More specifically, FIG. 7A is a diagram of a structure on a cross section perpendicular to the length direction of a multi-core fiber 2 according to the embodiment, and FIG. 7B is a schematic diagram of refractive index profiles and effective refractive indices along line B-B in FIG. 7A. Thus, the relationship between the refractive index and the effective refractive index does not always fall as in FIG. 7B.

As depicted in FIG. 7A, the multi-core fiber 2 according to the embodiment is different from the multi-core fiber 1 according to the first embodiment in that the multi-core fiber 2 includes a first clad 13 that surrounds the outer circumferential surfaces of cores 11 and 12 with no spacing and a second clad 14 that surrounds the outer circumferential surface of the first clad 13 with no spacing, and a clad 20 that surrounds the outer circumferential surface of the second clad 14 with no spacing. Here, the core 11, the first clad 13 surrounding the core 11, and the second clad 14 surrounding the first clad 13 are referred to as a first core element 11a, and the core 12, the first clad 13 surrounding the core 12, and the second clad 14 surrounding the first clad 13 are referred to as a second core element 12a. In the embodiment, the outer diameters of the first clads 13 are equal to each other, and the outer diameters of the second clads 14 are equal to each other. Thus, the thicknesses of the first clads 13 are equal to each other, and the thicknesses of the second clads 14 are equal to each other. Moreover, although not limited particularly, for example, the outer diameter of the first clad 13 is 19 μm, and the outer diameter of the second clad 14 is 27 μm.

Furthermore, suppose that the refractive index of the core 11 is $n_{1-1}$ and the refractive index of the core 12 is $n_{1-2}$. As depicted in FIG. 7B, a refractive index $n_2$ of the first clad 13 is made lower than the refractive index $n_{1-1}$ of the core 11 and the refractive index $n_{1-2}$ of the core 12, and a refractive index $n_3$ of the second clad 14 is further made lower than the refractive index $n_2$ of the first clad 13. In addition, a refractive index $n_4$ of the clad 20 is made lower than the refractive index $n_{1-1}$ of the core 11 and the refractive index $n_{1-2}$ of the core 12, and made higher than the refractive index $n_3$ of the second clad 14. In other words, the refractive indices $n_{1-1}$ to $n_4$ satisfy all of expressions.

$$n_{1-1} > n_2 > n_3$$

$$n_{1-2} > n_2 > n_3$$

$$n_{1-1} > n_4$$

$$n_{1-2} > n_4$$

$$n_3 < n_4$$

Thus, in the case where the core elements 11a and 12a are seen from the viewpoint of the refractive indices, the core elements 11a and 12a have trench structures.

It is noted that in FIG. 7B, the refractive indices of an inner protective layer 31 and an outer protective layer 32 are omitted.

As described above, the refractive index $n_3$ of the second clad 14 is made smaller than the refractive index $n_2$ of the first clad 13 and the refractive index $n_4$ of the clad 20, so that the optical confinement effect of the cores 11 and 12 is made greater, and it can be prevented that light propagating through the cores 11 and 12 leaks out of the core elements 11a and 12a. The second clad 14 and the clad 20 of a low refractive index then function as barriers, and the crosstalk between the cores 11 and 12 adjacent to each other can be further prevented.

As similar to the multi-core fiber 1 according to the first embodiment, a mode field diameter difference ΔMFD between the core 11 of the core element 11a and the core 12 of the core element 12a adjacent to each other is 1 μm or less, and an effective refractive index difference $\Delta n_{eff}$ between the core 11 of the core element 11a and the core 12 of the core element 12a adjacent to each other satisfies Expression (1) above.

It is noted that the refractive index difference between the first clad 13 and the clad 20 is often nearly zero. However, the refractive index difference is appropriately set to positive and negative values in order to adjust the wavelength dispersion characteristics. Thus, in FIG. 7B, the refractive index $n_2$ of the first clad 13 is set similar to the refractive index $n_4$ of the clad 20. However, the refractive index $n_2$ of the first clad 13 may be set between the refractive index $n_4$ of the clad 20 and the refractive index $n_{1-1}$ of the core 11 and the refractive index $n_{1-2}$ of the core 12, or may be set between the refractive index $n_4$ of the clad 20 and the refractive index $n_3$ of the second clad 14.

Figure 8:
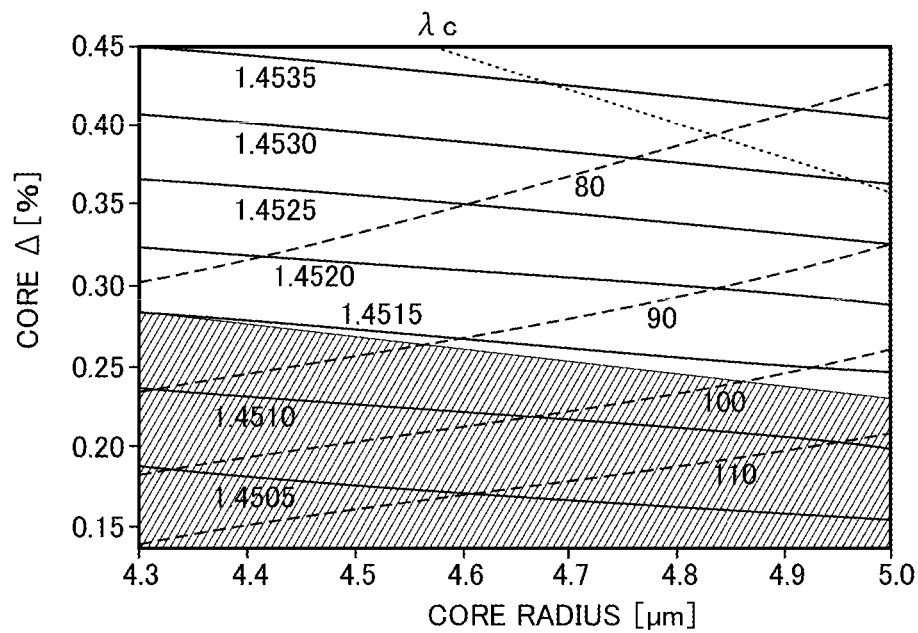
FIG. 8 is a diagram of the distribution of the effective refractive index of a core shown by a method similar to the method in FIG. 4 in the case where the radius of the core and the refractive index difference between the core and a clad are determined at a wavelength of 1,550 nm in an optical fiber including a core element in a trench structure in which the ratio of the thickness of a second clad to the radius of the core is 1.0 and the ratio of the radius of the circumference of a first clad to the radius of the core is 2.0.

FIG. 8 is a diagram of the distribution of the effective refractive index of a core shown by a method similar to the method in FIG. 4 in the case where the radius of the core and the refractive index difference between the core and a clad are determined at a wavelength of 1,550 nm, in an optical fiber including a core element in a trench structure in which the ratio of the thickness of a second clad to the radius of the core is 1.0 and the ratio of the radius of the circumference of a first clad to the radius of the core is 2.0. Also in FIG. 8, a hatched region is a region in which the bending loss is 0.5 dB or more in the case where light at a wavelength of 1,625 nm is wound at 100 turns at a radius of 30 mm and is the region not usable in the optical fiber in a waveband of 1.5 μm, and the cutoff wavelength is a wavelength of 1,530 nm or more in the region at the upper right of a dotted line indicated as λc.

In FIG. 8, as similar to the description using FIG. 4, attention is focused on two effective refractive indices 1.4530 and 1.4520 between which the effective refractive index difference $\Delta n_{eff}$ is 0.001, for example. A solid line at which the effective refractive index is 1.4530 and a solid line at which the effective refractive index is 1.4520 are distributed in a wider range than the region in which the multi-core fiber can be used (the region not included in the hatched region and on the left side of λc indicated by a dotted line). Thus, two types of cores between which the mode field diameter difference is smaller than 1 μm and between which the effective refractive index difference $\Delta n_{eff}$ is 0.001 can be designed in such a way that the cores are located in the region in which the optical fiber can be used. Moreover, as described in the first embodiment, when the core pitch D ranges from 30 μm to 50 μm from Expression (3), the effective refractive index difference $\Delta n_{eff}$ is smaller than 0.001. Thus, the effective refractive index difference $\Delta n_{eff}$ given by Expression (3) is distributed in a wide range in which the multi-core fiber can be used. In other words, even in the multi-core fiber having the core elements in the trench structure, in this case, the core elements can coexist in a single clad.

On the other hand, also in FIG. 8, as similar to FIG. 4, attention is focused on two effective refractive indices between which the mode field diameter difference is smaller than 1 μm and between which the effective refractive index difference $\Delta n_{eff}$ exceeds 0.002. When the effective refractive index is determined for one of the cores in such a way that the core is located in the usable region, it is difficult to determine the effective refractive index for the other core in such a way that the core is located in the usable region. Thus, even in the multi-core fiber having the core elements in the trench structure, in order to dispose two cores in a single clad in the usable state, the effective refractive index difference $\Delta n_{eff}$ may be 0.002 or less.

This means that the effective refractive index difference $\Delta n_{eff}$ between the core 11 and the core 12 of the multi-core fiber 2 satisfies Expression (1) above, as described above.

Figure 9:
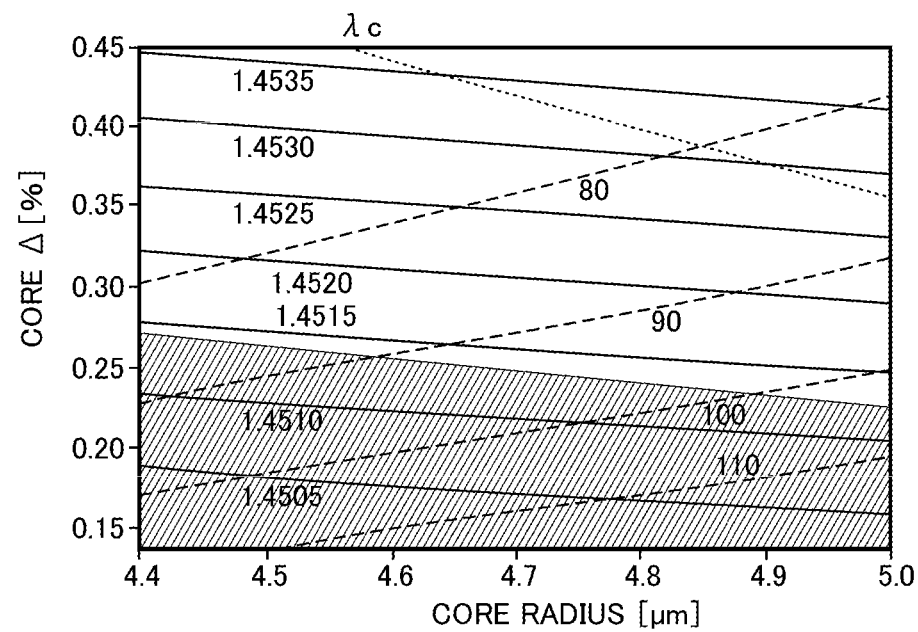
FIG. 9 is a diagram similar to FIG. 8 in the case where the ratio of the thickness of a second clad to the radius of the core is 1.1 and the ratio of the radius of the circumference of a first clad to the radius of the core is 1.9.
Figure 10:
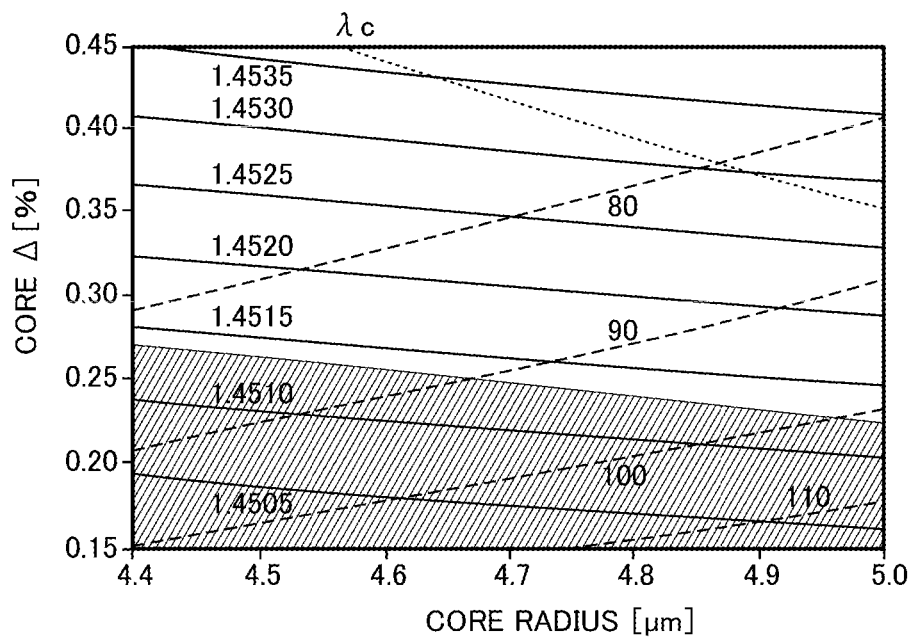
FIG. 10 is a diagram similar to FIG. 8 in the case where the ratio of the thickness of a second clad to the radius of the core is 1.2 and the ratio of the radius of the circumference of a first clad to the radius of the core is 1.8.
Figure 11:
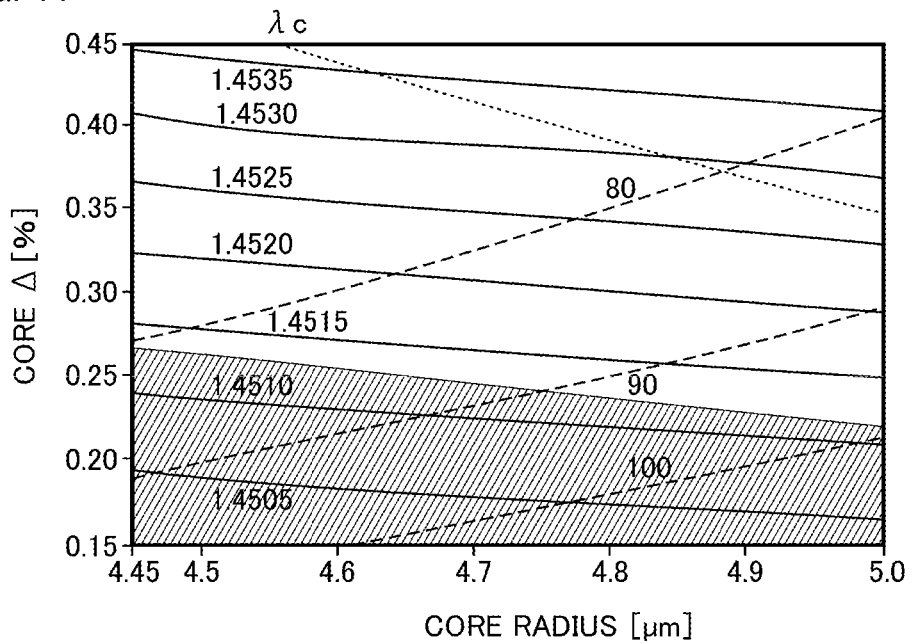
FIG. 11 is a diagram similar to FIG. 8 in the case where the ratio of the thickness of a second clad to the radius of the core is 1.3 and the ratio of the radius of the circumference of a first clad to the radius of the core is 1.7.

FIG. 9 is a diagram similar to FIG. 8 in the case of an optical fiber in which the ratio of the thickness of a second clad to the radius of the core is 1.1 and the ratio of the radius of the circumference of a first clad to the radius of the core is 1.9. Also in FIG. 9, as similar to the description using FIG. 8, it is shown that two cores can be disposed in a single clad when the effective refractive index difference $\Delta n_{eff}$ satisfies Expression (1) above. Moreover, FIG. 10 is a diagram similar to FIG. 8 in the case of an optical fiber in which the ratio of the thickness of a second clad to the radius of the core is 1.2 and the ratio of the radius of the circumference of a first clad to the radius of the core is 1.8. FIG. 11 is a diagram similar to FIG. 8 in the case of an optical fiber in which the ratio of the thickness of a second clad to the radius of the core is 1.3 and the ratio of the radius of the circumference of a first clad to the radius of the core is 1.7. Also in FIGS. 10 and 11, as similar to FIG. 4, it is shown that two cores can be disposed in a single clad when the effective refractive index difference $\Delta n_{eff}$ satisfies Expression (1) above. In other words, as apparent from the description using FIGS. 8 to 11, it is shown that in order to dispose two cores in a single clad regardless of the ratio of the thickness of the second clad to the radius of the core and the ratio of the radius of the circumference of the first clad to the radius of the core, the effective refractive index difference $\Delta n_{eff}$ satisfies Expression (1) above.

It is noted that in the embodiment, the refractive indices $n_2$ of the first clads 13 are equal to each other in the core elements 11a and 12a, and the refractive indices $n_3$ of the second clads 14 are equal to each other in the core elements 11a and 12a. However, the refractive index $n_2$ of the first clad 13 in the core element 11a and the refractive index $n_2$ of the first clad 13 in the core element 12a may have different refractive indices from each other depending on the effective refractive index difference $\Delta n_{eff}$ between the core 11 and the core 12. Similarly, the refractive index $n_3$ of the second clad 14 in the core element 11a and the refractive index $n_3$ of the second clad 14 in the core element 12a may have different refractive indices from each other depending on the effective refractive index difference $\Delta n_{eff}$ between the core 11 and the core 12.

As described above, in accordance with the multi-core fiber 2 according to the embodiment, in the core elements 11a and 12a, the cores 11 and 12 are surrounded by the first clad 13 having the refractive index $n_2$ smaller than the refractive index $n_{1-1}$ of the core 11 and the refractive index $n_{1-2}$ of the core 12, and the first clad 13 is surrounded by the second clad 14 having the refractive index $n_3$ smaller than the refractive index $n_2$ of the first clad 13. Thus, light propagating through the cores 11 and 12 is more properly confined in the cores 11 and 12. Moreover, since the refractive index $n_4$ of the clad 20 is made lower than the refractive index $n_{1-1}$ of the core 11 and the refractive index $n_{1-2}$ of the core 12, light is attracted to the cores 11 and 12 more than the clad 20 side. Thus, it is suppressed that light propagating through the cores 11 and 12 leaks out of the core elements 11a and 12a. Accordingly, according to the multi-core fiber 2, the crosstalk between the cores 11 and 12 can be further reduced.

It is noted that in the description above, the outer diameters of the first clads 13 are equal to each other, and the outer diameters of the second clads 14 are equal to each other. However, for example, the outer diameter of the first clad 13 in the core element 11a and the outer diameter of the first clad 13 in the core element 12a may be different from each other depending on the effective refractive index difference $\Delta n_{eff}$ between the core 11 and the core 12, and the outer diameter of the second clad 13 in the core element 11a and the outer diameter of the second clad 14 in the core element 12a may be different from each other depending on the effective refractive index difference $\Delta n_{eff}$ between the core 11 and the core 12.

Although the present invention has been described above by reference to a certain embodiment as an example, the present invention is not limited thereto.

Figure 12:
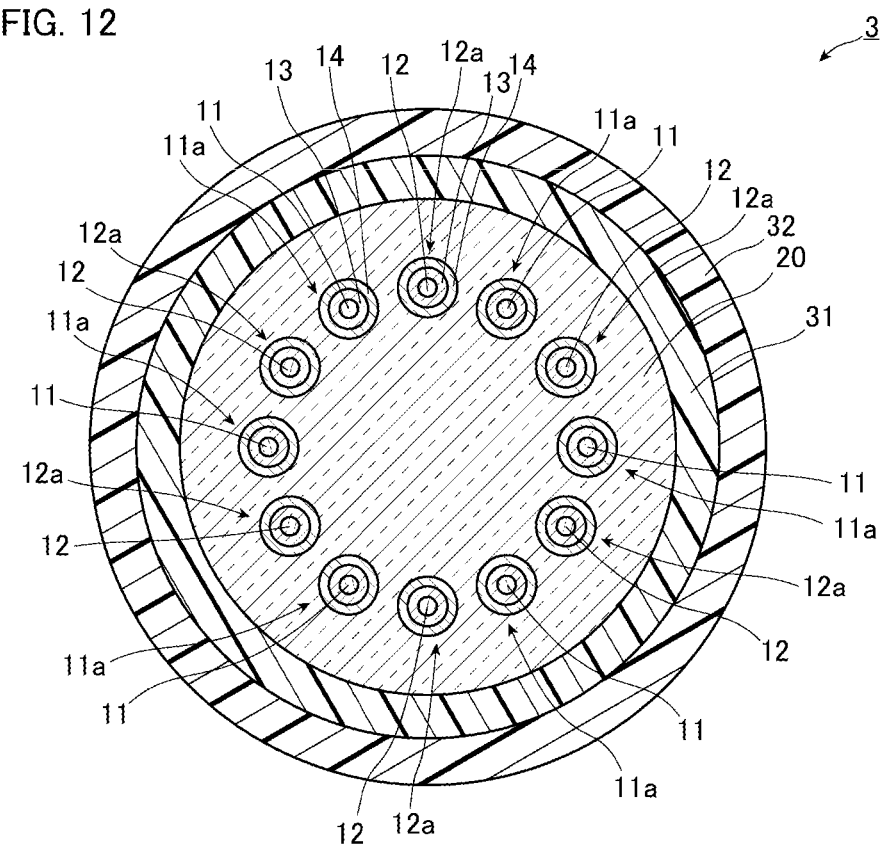
FIG. 12 is a diagram of an exemplary modification of the multi-core fiber according to the second embodiment.

For example, in the first and the second embodiments, the number of the cores is six. However, the number of the cores is an even number of six or more, and the number is not limited specifically as long as the cores can be accommodated in the clad 20. FIG. 12 is a diagram of an example of this multi-core fiber, and is a diagram of an exemplary modification of the multi-core fiber according to the second embodiment. It is noted that in describing FIG. 12, components the same as or equivalent to the components of the second embodiment are designated the same reference numerals and signs, and the overlapping description is omitted unless otherwise specified. In a multi-core fiber 3 depicted in FIG. 12, the numbers of the core elements 11a and 12a according to the second embodiment are increased, and the number of the core elements is 12 in total. The inter-center pitches between the cores 11 and 12 are equal to each other, and the cores 11 and 12 are disposed in a regular dodecagon in which the center is aligned with the axis of the clad 20. It is noted that it can be thought as well that the cores 11 and 12 are annularly disposed in which the center is aligned with the axis of the clad 20.

Figure 13:
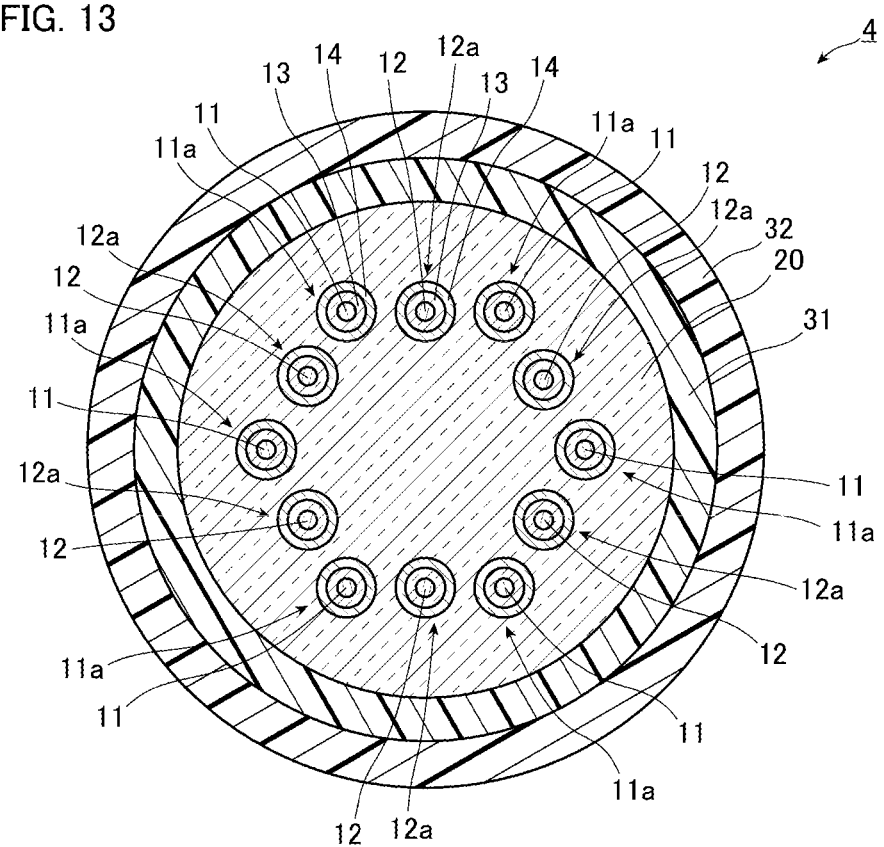
FIG. 13 is a diagram of another exemplary modification of the multi-core fiber according to the second embodiment.

Moreover, in the case where the number of the cores 11 and 12 is n, the cores 11 and 12 may not be disposed in an n-sided regular polygon. FIG. 13 is a diagram of an example of this multi-core fiber, and is a diagram of another exemplary modification of the multi-core fiber according to the second embodiment. It is noted that in describing FIG. 13, components the same as or equivalent to the components of the second embodiment are designated the same reference numerals and signs, and the overlapping description is omitted unless otherwise specified. In a multi-core fiber 4 depicted in FIG. 13, as similar to the multi-core fiber depicted in FIG. 12, the numbers of the core elements 11a and 12a according to the second embodiment are increased, and the number of the core elements is 12 in total. The inter-center pitches between the cores 11 and 12 are equal to each other, and the cores 11 and 12 are disposed in a regular hexagon as a whole. In other words, a regular hexagon is formed in which the cores are disposed at six vertices and on six sides and the core pitches are equal to each other. As described above, even in the case where the cores are not disposed in an n-sided polygon as a whole when the number of the cores 11 is n, the cores may be disposed in a regular hexagon as a whole in which the cores are disposed at vertices and on sides and the core pitches are equal as in the exemplary modification. In this case, the number of the cores is a multiple of six, 12 or more. As described above, even though the cores 11 and 12 are not disposed in a regular n-sided polygon as a whole when the number of the cores 11 and 12 is n, the multi-core fiber is nonlinearly disposed while suppressing splicing losses in which the crosstalk between cores adjacent to each other can be suppressed even in the case where the difference in the mode field diameter of light propagating through the cores is 1 μm or less and the effective refractive index difference $\Delta n_{\mathit{eff}}$ satisfies Expression (1).

EXAMPLES

Hereinafter, although the present invention will be more concretely explained with examples and comparative examples, the present invention is not limited thereto.

First Example

A multi-core fiber made of pure silica glass was prepared in which six cores formed of two types of cores were disposed in a clad having a diameter of 160 μm in a regular hexagon as a whole at regular spacings. Two types of the cores were alternately disposed, and the core pitch between the cores adjacent to each other was 40 μm. In one of the two types of the cores, the radius was 4.5 μm, the refractive index difference with respect to the clad was 0.40%, and the effective refractive index was 1.453. Moreover, in the other of the two types of the cores, the radius was 4.0 μm, the refractive index difference with respect to the clad was 0.35%, and the effective refractive index was 1.452. Thus, the effective refractive index difference between the cores adjacent to each other is 0.001.

In the case where light at a wavelength of 1,550 nm was propagated through this multi-core fiber, in one of the two types of the cores, the cutoff wavelength was a wavelength of 1,382 nm, the effective area was 76.8 μm$^2$, the mode field diameter was 10.1 μm, a bending loss at a bending radius of 10 mm was 1.6 dB/m, and the wavelength dispersion was 18.6. Moreover, in the other of the two types of the cores, the cutoff wavelength was a wavelength of 1,147 nm, the effective area was 78.3 μm$^2$, the mode field diameter was 10.6 μm, a bending loss at a bending radius of 10 mm was 93 dB, and the wavelength dispersion was 16.1 ps/nm/km. Thus, the mode field diameter difference between the two types of the cores was 0.5 μm. Even in the case where different cores were fusion-spliced to each other, a significantly excellent value was obtained for the splicing loss as 0.12 dB.

Next, signal light at a wavelength of 1,550 nm was propagated through this multi-core fiber for 100 km, and the relationship between the bending radius and the crosstalk was examined. The result is shown in FIG. 14.

Figure 14:
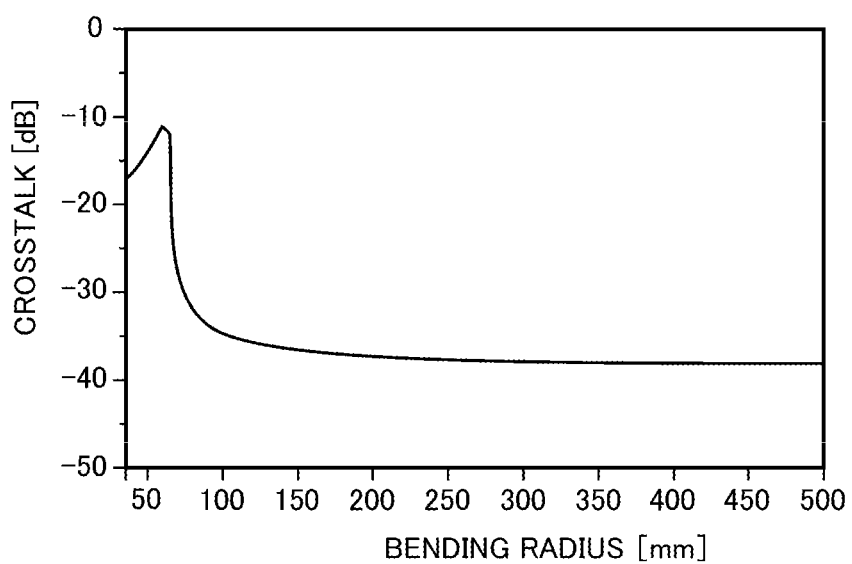
FIG. 14 is a diagram of the relationship between crosstalk and the bending radius of a multi-core fiber according to a first example.

From FIG. 14, a bending radius at which crosstalk was at a peak was about 50 mm. Moreover, at a bending radius of 100 mm, which is the minimum bending radius at which a typical optical fiber can be used, the crosstalk was rarely degraded.

Second Example

In one of two types of cores, the radius was 4.8 μm, the refractive index difference with respect to the clad was 0.41%, and the effective refractive index was 1.4534. Moreover, in the other of the two types of the cores, the radius was 4.3 μm, the refractive index difference with respect to the clad was 0.36%, and the effective refractive index was 1.4524. Thus, the effective refractive index difference between the cores adjacent to each other is 0.001. The conditions other than these were set similar to the conditions in the first embodiment.

In the case where light at a wavelength of 1,550 nm was propagated through this multi-core fiber, in one of the two types of the cores, the cutoff wavelength was a wavelength of 1,489 nm, the effective area was 80.2 μm$^2$, the mode field diameter was 10.2 μm, a bending loss at a bending radius of 10 mm was 0.37 dB/m, and the wavelength dispersion was 19.5. Moreover, in the other of the two types of the cores, the cutoff wavelength was a wavelength of 1,247 nm, the effective area was 79.5 μm$^2$, the mode field diameter was 10.5 μm, a bending loss at a bending radius of 10 mm was 25 dB, and the wavelength dispersion was 17.5 ps/nm/km. Thus, the mode field diameter difference between the two types of the cores was 0.3 μm.

The average fusion splicing loss of this multi-core fiber was significantly small as 0.09 dB. As described above, it was shown that the splicing loss was small in the case where a plurality of the multi-core fibers was connected because the multi-core fiber according to the example had a small mode field diameter difference between the cores.

Next, signal light at a wavelength of 1,550 nm was propagated through this multi-core fiber for 100 km, and the relationship between the bending radius and the crosstalk was examined. The result is shown in FIG. 15.

Figure 15:
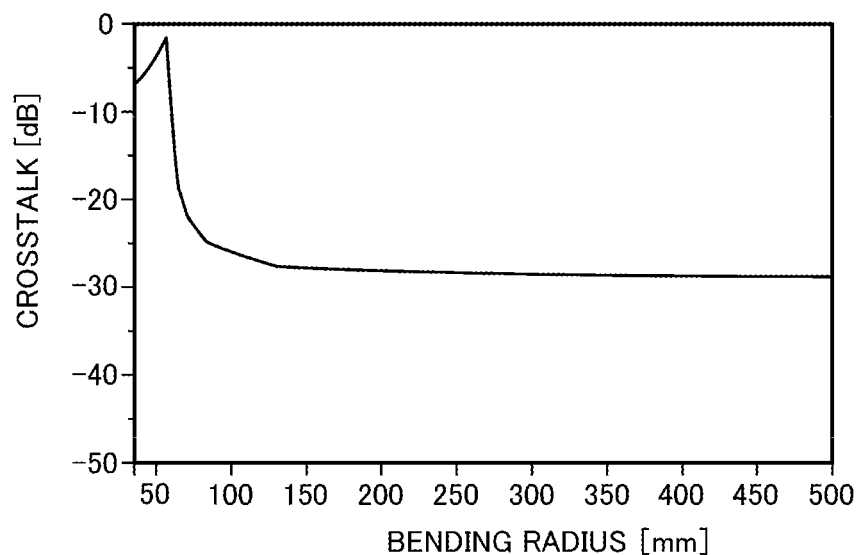
FIG. 15 is a diagram of the relationship between crosstalk and the bending radius of a multi-core fiber according to a second example.

From FIG. 15, a bending radius at which crosstalk was at a peak was about 50 mm. Crosstalk was rarely degraded at a bending radius of 100 mm, which is the minimum bending radius at which the optical fiber can be generally used.

Third Example to Fifth Example

Parameters shown in Table 1 below were used to prepare a multi-core fiber in which 12 of two types of cores elements were disposed in a regular dodecagon as a whole as depicted in FIG. 12 and a multi-core fiber in which 12 of two types of cores elements were disposed in a regular hexagon as a whole as depicted in FIG. 13. However, the core pitch was set to 31 μm. The outer diameter of the clad of the multi-core fiber in which the cores were disposed in a regular dodecagon as a whole ranged from 188 μm to 196 μm, and the outer diameter of the clad of the multi-core fiber in which the cores were disposed in a regular hexagon as a whole ranged from 192 μm to 200 μm. Moreover, the effective areas $A_{eff}$ of the cores at a wavelength of 1,550 nm were 90 μm$^2$, and the cable cutoff wavelength was a wavelength of 1,530 nm. It is noted that in Table 1, w expresses the thickness of the second clad, $r_1$ expresses the radii of the cores, and $r_2$ expresses the radius of the circumference of the first clad. Thus, $w/r_1$ expresses the ratio of the thickness of the second clad to the radius of the core, and $r_2/r_1$ expresses the ratio of the radius of the circumference of the first clad to the radius of the core. Furthermore, $\Delta_1$ expresses the refractive index difference between the cores and the clad. In addition, since differences in characteristics were not observed between the multi-core fiber in which the cores were disposed in a regular dodecagon as a whole and the multi-core fiber in which the cores were disposed in a regular hexagon as a whole specifically, the multi-core fiber in which the cores were disposed in a regular dodecagon as a whole and the multi-core fiber in which the cores were disposed in a regular hexagon as a whole, which were prepared according to the parameters below, are categorized in one embodiment.

TABLE 1

| | | | core 1 | | core 2 | | |
| --- | --- | --- | --- | --- | --- | --- | --- |
| | $w/r_1$ | $r_2/r_1$ | $r_1$ [μm] | $\Delta_1$ [%] | $r_1$ [μm] | $\Delta_1$ [%] | $\Delta n_{eff}$ |
| Third Example | 1.0 | 2.0 | 5.00 | 0.330 | 4.59 | 0.268 | 0.00099 |
| Fourth Example | 1.1 | 1.9 | 5.00 | 0.322 | 4.59 | 0.255 | 0.00105 |
| Fifth Example | 1.2 | 1.8 | 5.00 | 0.308 | 4.62 | 0.244 | 0.00100 |

Next, signal light at a wavelength of 1,550 nm was propagated through these multi-core fibers for 100 km, and the relationship between the bending radius and the crosstalk was examined. The result is shown in FIG. 16.

Figure 16:
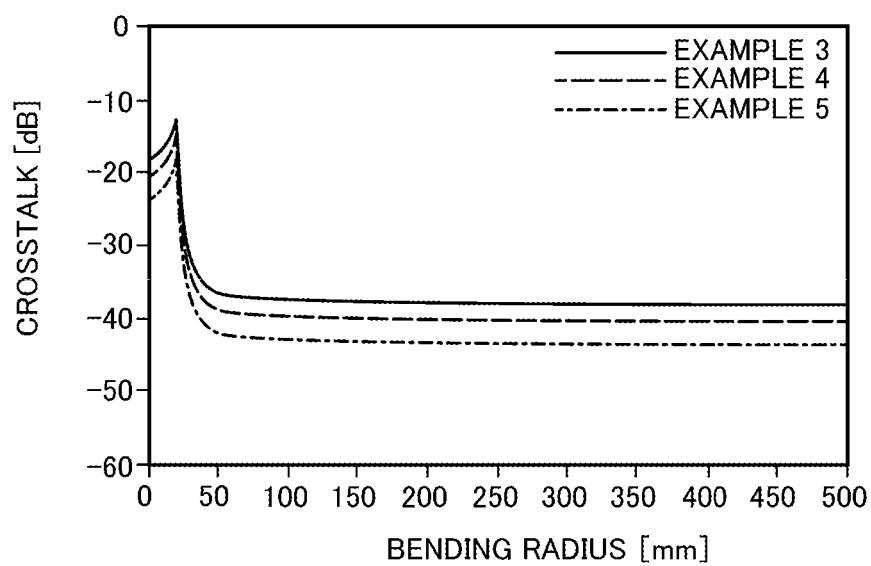
FIG. 16 is a diagram of the relationship between crosstalk and the bending radii of multi-core fibers according to a third example to a fifth example.

From FIG. 16, a bending radius at which crosstalk was at a peak was about 20 mm. Moreover, at a bending radius of 100 mm, which is the minimum bending radius at which a typical optical fiber can be used, the crosstalk was rarely degraded.

Sixth Example to Eighth Example

Next, multi-core fibers similar to the multi-core fibers according to the third example to the fifth example were prepared as core pitches were 32 μm. The parameters of the multi-core fiber according to a sixth example were similarly set to the parameters of the third example, the parameters of the multi-core fiber according to a seventh example were similarly set to the parameters of the fourth embodiment, and the parameters of the multi-core fiber according to an eight example were similarly set to the parameters of the fifth example.

Next, signal light at a wavelength of 1,550 nm was propagated through these multi-core fibers for 100 km, and the relationship between the bending radius and the crosstalk was examined. The result is shown in FIG. 17.

Figure 17:
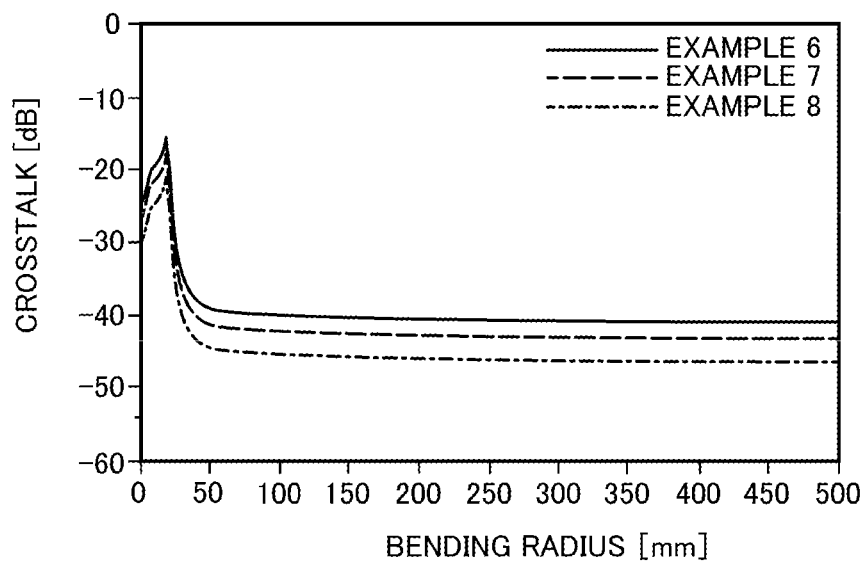
FIG. 17 is a diagram of the relationship between crosstalk and the bending radii of multi-core fibers according to a sixth example to an eighth example.

From FIG. 17, a bending radius at which crosstalk was at a peak was about 20 mm. Moreover, at a bending radius of 100 mm, which is the minimum bending radius at which a typical optical fiber can be used, the crosstalk was rarely degraded.

Ninth Example to Eleventh Example

Next, multi-core fibers similar to the multi-core fibers in the third example to the fifth example were prepared as core pitches were 33 μm. The parameters of the multi-core fiber according to a ninth example were similarly set to the parameters of the third example, the parameters of the multi-core fiber according to a tenth example were similarly set to the parameters of the fourth embodiment, and the parameters of the multi-core fiber according to an eleventh example were similarly set to the parameters of the fifth example.

Next, signal light at a wavelength of 1,550 nm was propagated through these multi-core fibers for 100 km, and the relationship between the bending radius and the crosstalk was examined. The result is shown in FIG. 18.

Figure 18:
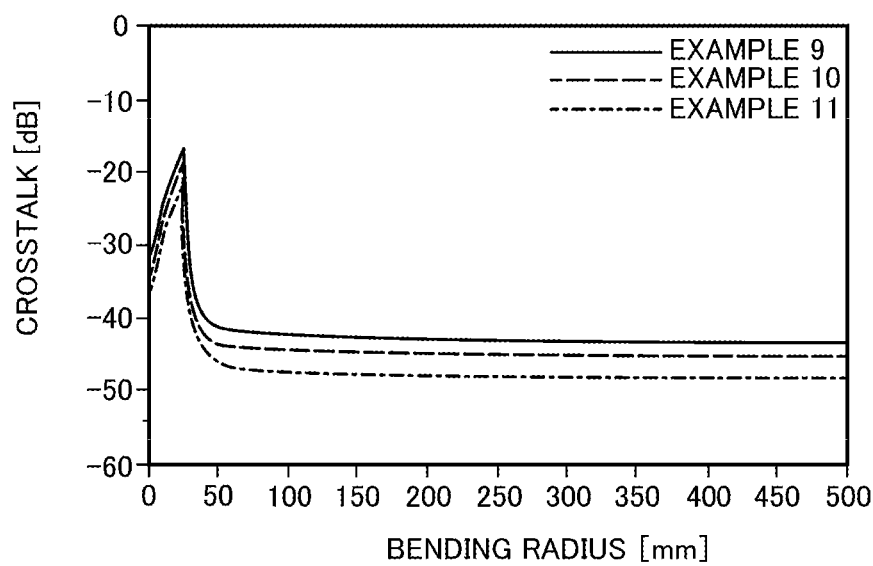
FIG. 18 is a diagram of the relationship between crosstalk and the bending radii of multi-core fibers according to a ninth example to an eleventh example.

From FIG. 18, a bending radius at which crosstalk was at a peak was about 25 mm. Moreover, at a bending radius of 100 mm, which is the minimum bending radius at which a typical optical fiber can be used, the crosstalk was rarely degraded.

Twelfth Example and Thirteenth Example

An analysis was conducted on the structure of a multi-core fiber in which two types of ten core elements in a trench structure in total were alternately disposed, in which the core pitches were equal to each other and the cores were disposed in a rectangular decagon as in the multi-core fiber 2 according to the second embodiment. In a multi-core fiber according to a twelfth example, the effective refractive index $A_{eff}$ was 110 μm$^2$, and in a multi-core fiber according to a thirteenth example, the effective refractive index $A_{eff}$ was 100 μm$^2$. Moreover, in the multi-core fibers, a refractive index difference $\Delta_2$ between the first clad and the clad was 0.0%, and a refractive index difference $\Delta_3$ between the second clad and the clad was −0.7%. Furthermore, the other parameters were set as parameters in Table 2 below.

TABLE 2

| | | | core 1 | | core 2 | | |
| --- | --- | --- | --- | --- | --- | --- | --- |
| | $w/r_1$ | $r_2/r_1$ | $r_1$ [μm] | $\Delta_1$ [%] | $r_1$ [μm] | $\Delta_1$ [%] | $\Delta n_{eff}$ |
| Twelfth Example | 1.0 | 2.0 | 5.56 | 0.269 | 5.03 | 0.213 | 0.0009 |
| Thirteenth Example | 1.0 | 2.0 | 5.30 | 0.300 | 4.82 | 0.238 | 0.001 |

Figure 19:
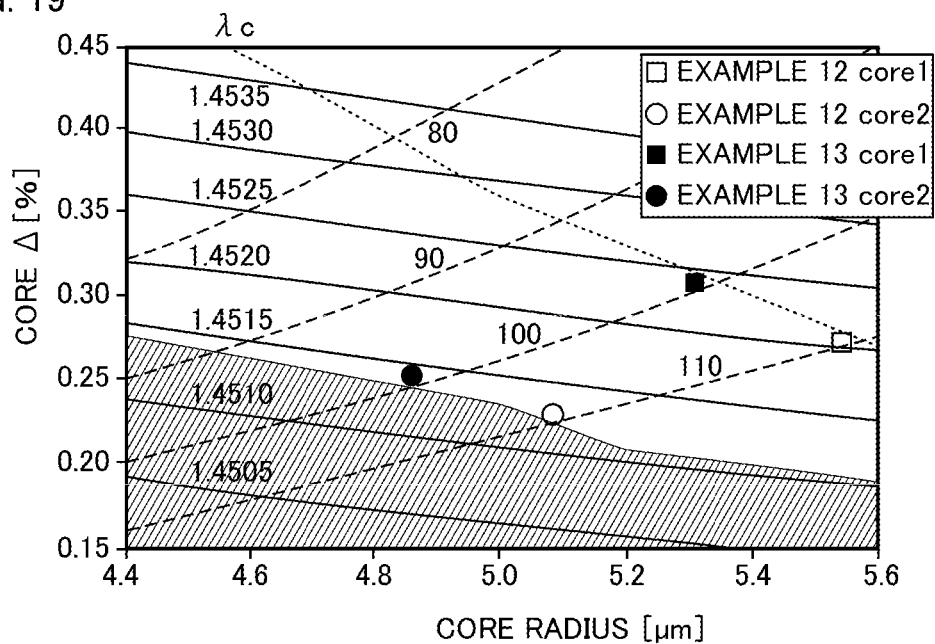
FIG. 19 is a diagram of the distribution of the effective refractive index $\Delta n_{eff}$ of a core at a wavelength of 1,550 nm according to a twelfth example and a thirteenth example similar to FIG. 8.

The distribution of the effective refractive index $\Delta n_{eff}$ of the core at a wavelength of 1,550 nm was calculated. The calculated reset is shown in FIG. 19.

$\Delta n_{eff}$ of the cores according to the twelfth example and the thirteenth example was values satisfying Expression (1). As depicted in FIG. 19, it was enabled to be confirmed that the cores according to the twelfth example and the thirteenth example were located in a usable region.

Next, the parameters according to the twelfth example were used to prepare a multi-core fiber in which the core pitch was 34 µm and the pitch from the outer circumferential surface of the clad to the core (the thickness of the outer clad) was 40 µm, and a multi-core fiber in which the core pitch was 37 µm and the thickness of the outer clad was 40 µm. The outer diameter of the clad was 190 µm for the multi-core fiber in which the core pitch was 34 µm, and the outer diameter of the clad was 200 µm for the multi-core fiber in which the core pitch was 37 µm.

Next, signal light at a wavelength of 1,550 nm was propagated through the multi-core fibers for 100 km, and the relationship between the bending radius and the crosstalk was examined. The result is shown in FIG. 20.

Figure 20:
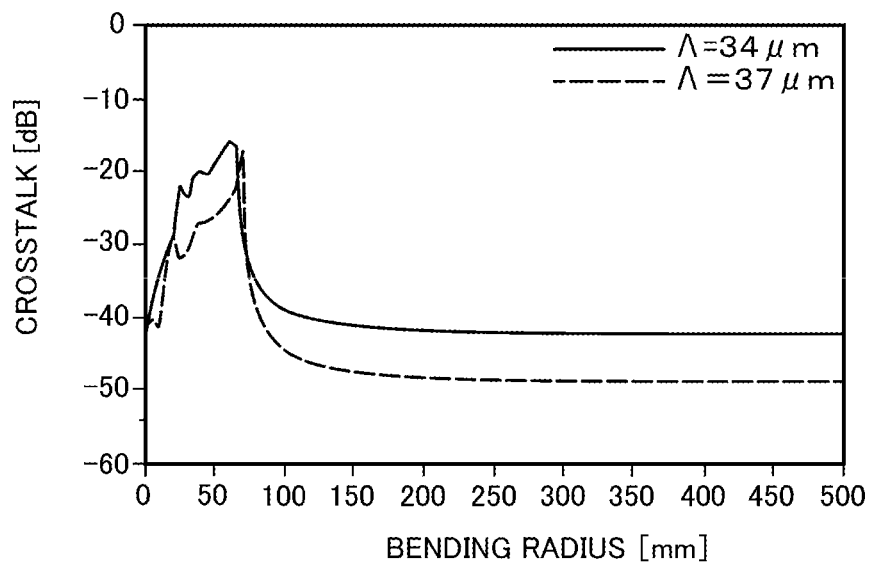
FIG. 20 is a diagram of the relationship between crosstalk and the bending radius of a multi-core fiber according to the twelfth example.

From FIG. 20, a bending radius at which crosstalk was at a peak was about 60 mm to 70 mm. Moreover, at a bending radius of 100 mm, which is the minimum bending radius at which a typical optical fiber can be used, crosstalk was rarely degraded. The multi-core fiber in which the core pitch was 34 µm achieved a low crosstalk as about −40 dB at the usable bending radius. The multi-core fiber in which the core pitch was 37 µm achieved a much lower crosstalk as about −50 dB at the usable bending radius.

Next, the parameters according to the thirteenth example were used to prepare a multi-core fiber in which the core pitch was 33 µm and the thickness of the outer clad was 37 µm and a multi-core fiber in which the core pitch was 38 µm and the thickness of the outer clad was 37 µm. The outer diameter of the clad was 181 µm for the multi-core fiber in which the core pitch was 33 µm, and the outer diameter of the clad was 197 µm for the multi-core fiber in which the core pitch was 38 µm.

Next, signal light at a wavelength of 1,550 nm was propagated through the multi-core fibers for 100 km, and the relationship between the bending radius and the crosstalk was examined. The result is shown in FIG. 21.

Figure 21:
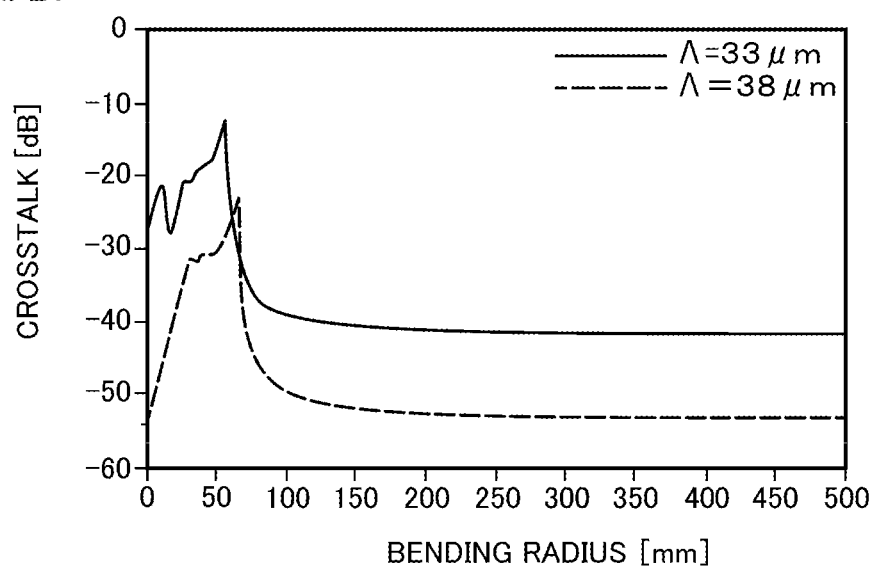
FIG. 21 is a diagram of the relationship between crosstalk and the bending radius of a multi-core fiber according to the thirteenth example.

From FIG. 21, a bending radius at which crosstalk was at a peak was about 50 mm to 60 mm. Moreover, at a bending radius of 100 mm, which is the minimum bending radius at which a typical optical fiber can be used, crosstalk was rarely degraded. The multi-core fiber in which the core pitch was 33 µm achieved a low crosstalk as about −40 dB at the usable bending radius. The multi-core fiber in which the core pitch was 38 µm achieved a much lower crosstalk as about −50 dB at the usable bending radius.

As described above, from the results of the examples, it was confirmed that the effective refractive index difference between the cores adjacent to each other satisfies Expression (1) and the bending radius of the optical fiber at which crosstalk is at a peak is a bending radius smaller than a bending radius of 100 mm, which is the minimum bending radius at which a typical optical fiber can be used. Moreover, it was confirmed that the difference in the mode field diameter of light propagating through the cores is as small as 1 µm or less, and splicing losses can be suppressed. Thus, according to the present invention, it can be considered that the crosstalk between cores adjacent to each other can be suppressed even in the case where the multi-core fiber 1 is nonlinearly disposed while suppressing splicing losses.

INDUSTRIAL APPLICABILITY

As described above, according to the present invention, there is provided a multi-core fiber that can suppress the crosstalk between cores adjacent to each other even in the case where the multi-core fiber is nonlinearly disposed while suppressing splicing losses, and the multi-core fiber can be excellently used for communication cables, for example.

REFERENCE SIGNS LIST 1 to 4 . . . Multi-core fiber
11, 12 . . . Core
11a, 12a . . . Core element
13 . . . First clad
14 . . . Second clad
20 . . . Clad
31 . . . Inner protective layer
32 . . . Outer protective layer

The invention claimed is:

1. A multi-core fiber comprising:
an even number of six or more of cores; and
a clad surrounding outer circumferential surfaces of the cores, wherein:
the even number of cores are formed of two types of cores between which an effective refractive index difference in a fundamental mode is different;
in the cores, the two types of cores are alternately disposed at regular spacings, and the cores are annularly disposed at an interior angle formed of lines connecting centers of the cores adjacent to each other, the interior angle being greater than an angle of 90°;
a difference in a mode field diameter of light propagating through the cores is 1 µm or less; and
an expression is satisfied:

$$1.450 \times 10^{-5} \times D \leq \Delta n_{\mathit{eff}} \leq 0.002$$

wherein an inter-center pitch between the cores adjacent to each other is D µm and an effective refractive index difference between the cores adjacent to each other is $\Delta n_{\mathit{eff}}$.

2. The multi-core fiber according to claim 1, wherein the inter-center pitch and the effective refractive index difference further satisfy an expression:

$$2.071 \times 10^{-5} \times D \leq \Delta n_{\mathit{eff}}.$$

3. The multi-core fiber according to claim 2, wherein the effective refractive index difference further satisfies an expression:

$$0.001 \leq \Delta n_{\mathit{eff}}.$$

4. The multi-core fiber according to claim 1, wherein when the number of cores is n, the cores are disposed in an n-sided regular polygon.

5. The multi-core fiber according to claim 1, wherein the cores are disposed in a regular hexagon.

6. The multi-core fiber according to claim 1, further comprising:
a first clad surrounding outer circumferential surfaces of the cores; and
a second clad surrounding an outer circumferential surface of the first clad, an outer circumferential surface of the second clad being surrounded by the clad,
wherein all of expressions are satisfied:

$$n_{1\text{-}1} > n_2 > n_3$$

$$n_{1\text{-}2} > n_2 > n_3$$

$$n_{1\text{-}1} > n_4$$

$$n_{1\text{-}2} > n_4$$

$$n_3 < n_4$$

wherein a refractive index of one of the two types of cores is $n_{1-1}$, a refractive index of the other of the two types of cores is $n_{1-2}$, a refractive index of the first clad is $n_2$, a refractive index of the second clad is $n_3$, and a refractive index of the clad is $n_4$.

7. The multi-core fiber according to claim 2, wherein when the number of cores is n, the cores are disposed in an n-sided regular polygon.

8. The multi-core fiber according to claim 3, wherein when the number of cores is n, the cores are disposed in an n-sided regular polygon.

9. The multi-core fiber according to claim 2, wherein the cores are disposed in a regular hexagon.

10. The multi-core fiber according to claim 3, wherein the cores are disposed in a regular hexagon.

11. The multi-core fiber according to claim 2, further comprising:
    a first clad surrounding outer circumferential surfaces of the cores; and
    a second clad surrounding an outer circumferential surface of the first clad, an outer circumferential surface of the second clad being surrounded by the clad,
    wherein all of expressions are satisfied:

$n_{1-1} > n_2 > n_3$ $n_{1-2} > n_2 > n_3$ $n_{1-1} > n_4$ $n_{1-2} > n_4$ $n_3 < n_4$ wherein a refractive index of one of the two types of cores is $n_{1-1}$, a refractive index of the other of the two types of cores is $n_{1-2}$, a refractive index of the first clad is $n_2$, a refractive index of the second clad is $n_3$, and a refractive index of the clad is $n_4$.

12. The multi-core fiber according to claim 3, further comprising:
    a first clad surrounding outer circumferential surfaces of the cores; and
    a second clad surrounding an outer circumferential surface of the first clad, an outer circumferential surface of the second clad being surrounded by the clad,
    wherein all of expressions are satisfied:

$n_{1-1} > n_2 > n_3$ $n_{1-2} > n_2 > n_3$ $n_{1-1} > n_4$ $n_{1-2} > n_4$ $n_3 < n_4$ wherein a refractive index of one of the two types of cores is $n_{1-1}$, a refractive index of the other of the two types of cores is $n_{1-2}$, a refractive index of the first clad is $n_2$, a refractive index of the second clad is $n_3$, and a refractive index of the clad is $n_4$.

13. The multi-core fiber according to claim 4, further comprising:
    a first clad surrounding outer circumferential surfaces of the cores; and
    a second clad surrounding an outer circumferential surface of the first clad, an outer circumferential surface of the second clad being surrounded by the clad,
    wherein all of expressions are satisfied:

$n_{1-1} > n_2 > n_3$ $n_{1-2} > n_2 > n_3$ $n_{1-1} > n_4$ $n_{1-2} > n_4$ $n_3 < n_4$ wherein a refractive index of one of the two types of cores is $n_{1-1}$, a refractive index of the other of the two types of cores is $n_{1-2}$, a refractive index of the first clad is $n_2$, a refractive index of the second clad is $n_3$, and a refractive index of the clad is $n_4$.

14. The multi-core fiber according to claim 5, further comprising:
    a first clad surrounding outer circumferential surfaces of the cores; and
    a second clad surrounding an outer circumferential surface of the first clad, an outer circumferential surface of the second clad being surrounded by the clad,
    wherein all of expressions are satisfied:

$n_{1-1} > n_2 > n_3$ $n_{1-2} > n_2 > n_3$ $n_{1-1} > n_4$ $n_{1-2} > n_4$ $n_3 < n_4$ wherein a refractive index of one of the two types of cores is $n_{1-1}$, a refractive index of the other of the two types of cores is $n_{1-2}$, a refractive index of the first clad is $n_2$, a refractive index of the second clad is $n_3$, and a refractive index of the clad is $n_4$.

* * * * *